US009026825B2

(12) United States Patent
Andreoli et al.

(10) Patent No.: US 9,026,825 B2
(45) Date of Patent: May 5, 2015

(54) MULTI-DEVICE POWERSAVING

(75) Inventors: Jean-Marc Andreoli, Meylan (FR);
Guillaume M. Bouchard,
Saint-Martin-le-Vinoux (FR)

(73) Assignee: Xerox Corporation, Norwalk, CT (US)

( * ) Notice: Subject to any disclaimer, the term of this patent is extended or adjusted under 35 U.S.C. 154(b) by 230 days.

(21) Appl. No.: 13/308,780

(22) Filed: Dec. 1, 2011

(65) Prior Publication Data
US 2013/0145187 A1 Jun. 6, 2013

(51) Int. Cl.
G06F 1/00 (2006.01)
G06F 3/12 (2006.01)
G06F 1/32 (2006.01)

(52) U.S. Cl.
CPC .............. *G06F 3/1221* (2013.01); *G06F 3/126* (2013.01); *G06F 3/1291* (2013.01); *Y02B 60/1271* (2013.01); *G06F 1/3284* (2013.01); *Y02B 60/1267* (2013.01)

(58) Field of Classification Search
USPC ......... 713/300, 310, 320, 321, 322, 323, 324, 713/330, 340, 375, 1, 2, 100
See application file for complete search history.

(56) References Cited

U.S. PATENT DOCUMENTS

| 6,167,524 A * | 12/2000 | Goodnow et al. ............. 713/300 |
| 6,453,127 B2 * | 9/2002 | Wood et al. ........................ 399/8 |
| 6,526,433 B1 * | 2/2003 | Chang et al. .................. 709/201 |
| 2006/0112388 A1 * | 5/2006 | Taniguchi et al. ............ 718/100 |
| 2006/0206445 A1 | 9/2006 | Andreoli et al. |
| 2008/0313640 A1 * | 12/2008 | Liu et al. ........................ 718/104 |
| 2009/0138878 A1 * | 5/2009 | Fernstrom et al. ............ 718/102 |
| 2009/0201531 A1 | 8/2009 | Pandit et al. |
| 2009/0300390 A1 * | 12/2009 | Vojak et al. .................... 713/323 |
| 2011/0010571 A1 | 1/2011 | Dance |
| 2011/0026070 A1 | 2/2011 | Kohli et al. |
| 2013/0163037 A1 | 6/2013 | Huster |

FOREIGN PATENT DOCUMENTS

| EP | 1 703 372 A1 | 9/2006 |
| WO | WO-2011-110673 A1 | 9/2011 |

OTHER PUBLICATIONS

Ciriza, et al. "User-friendly power management algorithms", hal-00142509, Version 1, Sep. 1, 2009, pp. 1-32.

(Continued)

*Primary Examiner* — Kim Huynh
*Assistant Examiner* — Paul J Yen
(74) *Attorney, Agent, or Firm* — Fay Sharpe LLP

(57) ABSTRACT

A control system reduces energy consumption in a multi-device system comprising a plurality of devices. The control system includes at least one processor. The processor is programmed to receive a job to be executed, as well as a selection of one of the plurality of devices for executing the job and a transfer cost for transferring the job from the selected device to each of the plurality of devices. A device to execute the job is determined through optimization of a first cost function. The first cost function is based on the device selection and the transfer costs. The job is assigned to the determined device and a time-out for each device in the multi-device system is determined through optimization of a second cost function. The second cost function is based on an expected energy consumption by the multi-device system. The devices are provided with the determined time-outs.

20 Claims, 10 Drawing Sheets

(56) References Cited

OTHER PUBLICATIONS

Bertsekas, D. P., "Chapter 6, Approximate Dynamic Programming", *Dynamic Programming and Optimal Control*, $3^{rd}$ Edition, vol. 2, MIT, Sep. 9, 2011, pp. 320-552.

Energy Star®, *Program Requirements for Imaging Equipment*, Version 1.0, downloaded Jun. 29, 2009, p. 1-19.

Helmbold, et al., Adaptive Disk Spin-Down Policies for Mobile Computers, *In Proc. 2nd USENIX Symp. on Mobile Networks and Applications*, 5 (2000) 285-297.

Lu, et al., Adaptive Hard Disk Power Management on Personal Computers, *IEEE Great Lakes Symposium on VLSI*, pp. 50-53, 1999.

Market Transformation Programme, *BNICT17: Energy Star® Specification for Imaging Equipment*, Version 2.1, May 25, 2006, available at www.mtprog.com. pp. 1-12.

Network Working Group, *RFC1759—Print MIB*, downloaded Jun. 29, 2009, available at http://www.faqs.org/rfcs/rfc1759.html. pp. 1-95.

Ciriza, et al., A Statistical Model for Optimizing Power Consumption of Printers, *Poster Presentation during a joint meeting of the Statistical Society of Canada & the Societe Franyaise de Statistique, in Ottawa* Congress *Centre*, May 25-29, 2008, pp. 1-7. (Re-submitted).

\* cited by examiner

MULTI-DEVICE POWERSAVING

BACKGROUND

The present exemplary embodiment relates generally to power management. It finds particular application in conjunction with a multi-device print system comprising a plurality of print devices and will be described with particular reference thereto. However, it is to be understood that it also finds application in other usage scenarios and is not necessarily limited to the aforementioned application.

Print devices typically include different operating modes corresponding to different power consumption levels. Such operating modes typically include idle modes and power saving modes. In an idle mode, a print device is ready to be used for printing, which typically requires the most power. When not in use, the print device is cycled down to a power saving mode, also known as standby mode, low power mode, or sleep mode. In the power saving mode, the print device draws enough power to support certain functions of the print device, but requires a warm up period before it is fully operational again.

The warm up period for a print device is actuated, for example, when a print job is received for printing or a user actuates the print device. The print device control system then activates components that draw additional power in preparation for use of the print device. For example, a printer may heat a fuser roll and cause the marking material to be readied for use. In the case of laser printers, this generally involves circulating the toner particles in a developer housing. For solid ink printers, the solid inks are heated to above their melting points.

Once a print device has been used, it may remain in an idle mode at the higher power consumption level for some predetermined period of time (a time-out), to maintain one or more components within an operational temperature range or state. The time-out reduces the number of cycles experienced by the components, which helps preserve their operational life and also reduces or eliminates waiting time for the customer. If the print device is not in use again by the preset time-out, the print device begins to cycle down to the power saving mode.

Currently, in most print devices, the inactivity period to wait before entering into sleep mode is either set by the administrator or predefined by the print device manufacturer according to environmental standards, such as Energy Star. Until 2006, print devices were evaluated as Energy Star compliant based on whether the manufacturer respected the time-out recommendations of the Environmental Protection Agency (EPA). The recommendations were dependent on the type of print device (e.g., scanner, copiers, multi-function devices) and its speed capabilities. Further, the recommendations were arbitrary and not self-adapted by any logic or intelligence embedded on print devices.

Today, Energy Star criteria are based on the evaluation of power consumption during a fixed period of a week in which the print device receives requests with a predefined standard usage pattern. The result of the evaluation method is the Typical Energy Consumption (TEC) value measured in kWh and which must be under a certain level in order to obtain the Energy Star certification. For example, for a color multi-function device producing 24 images per minute (IPM), its power consumption must be below (0.2 kWh*24)+5 kWh. Although the current evaluation method takes into account a usage pattern, it does not take into account the stochastic nature of usage patterns.

In order to respect TEC maximum levels, manufacturers employ time-out strategies which reduce the time-outs and make improvements in power consumption. One strategy for accomplishing this is to adjust time-out according to the unavailability time of the print device during switching from sleep to an active status. Another strategy is to set time-out according to the relation between the idle period and the wakeup delay (i.e., the time to get out of power saving mode). If this relation is small, time-out increases; otherwise, time-out decreases. However, in most cases, time-out values are static and/or not adapted to the real usage of devices.

Further, print devices are typically deployed in a multi-device print system comprising a plurality of print devices, where each print device is typically capable of executing incoming print jobs. In such systems, users typically specify the print devices they want to execute their print jobs. In doing so, users commonly select the print devices that are most convenient or best for them. However, users often fail to consider the power costs. For example, while a user may prefer a certain print device, if the print device is in a power saving mode, the cost of waking the print device up may outweigh the "cost" to the user of printing to another print device.

The present disclosure provides a new and improved system and method which overcome the above-referenced problems and others.

INCORPORATION BY REFERENCE

The following reference, the disclosure of which is incorporated herein by reference in its entirety, is mentioned.

U.S. Pub. No. 20110010571, entitled PRINTER TIME-OUT, by Dance, et al., discloses a method for calculating a time-out for a single print device. The method includes acquiring data comprising a set of inter-arrival times and, for each of a set of candidate time-outs, deriving a probability that an inter-arrival time from the set of inter-arrival times is greater than the candidate time-out. A cost function is computed, based on the derived probability and a robustness term, and a time-out is identified for the device for which the cost function is a minimum.

BRIEF DESCRIPTION

In accordance with one aspect of the present disclosure, a control system for reducing energy consumption in an associated multi-device system including a plurality of devices is provided. The control system includes at least one processor. The processor is programmed to receive a job to be executed, as well as a selection of one of the plurality of devices for executing the job and a transfer cost for transferring the job from the selected device to each of the others of the plurality of devices. A device from the plurality of devices to execute the job is determined through optimization of a first cost function. The first cost function is based on the device selection and the received transfer costs. The job is assigned to the determined device and a time-out for each device in the multi-device system is determined through optimization of a second cost function. The second cost function is based on an expected energy consumption by the multi-device system. The devices are provided with the determined time-outs.

In accordance with another aspect of the present disclosure, a method for reducing energy consumption in a multi-device system comprising a plurality of devices is provided. A job to be executed is received, as well as a selection of one of the plurality of devices for executing the job and a transfer cost for transferring the job from the selected device to each of the plurality of devices. A device from the plurality of the devices to execute the job is determined through optimization of a first cost function. The first cost function is based on the device selection and the received transfer costs. The job is assigned to the determined device and a time-out for each device in the multi-device system is determined through optimization of a second cost function. The second cost function is based on an expected energy consumption by the multi-device system. The devices are provided with the determined time-outs.

In accordance with another aspect of the present disclosure, a printing system is provided. The printing system includes a plurality of print devices and a control system configured for reducing energy consumption. The control system includes at least one processor programmed to receive a print job to be executed, as well as a selection of one of the plurality of print devices for executing the print job and a transfer cost for transferring the print job from the selected print device to each of the plurality of print devices. A print device from the plurality of print devices to execute the print job is determined through optimization of a first cost function. The first cost function based on the print device selection and the received transfer costs. The print job is assigned to the determined print device and a time-out for each of the plurality of print devices is determined through optimization of a second cost function. The second cost function is based on an expected energy consumption by the printing system. The print devices are provided with the determined time-outs.

DETAILED DESCRIPTION

The exemplary embodiment provides a method for reducing power consumption in a multi-device system which includes plural devices capable of performing the same job, such as a network print system. Jobs to be executed by one of the devices, such as print jobs, are selectively transferred from a selected device to another device, in the exemplary embodiment, when doing so reduces power consumption of the system and the reduction outweighs the transfer costs. To further minimize power consumption, time-outs for the devices are optimized to minimize the expected cost to the system.

As used herein, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

A "time-out" is a time period after a job has been received (or completed) by a device, during which the device remains in a high energy-consuming state (such as an idle mode in the case of a print device, where the print device is ready to print) before transferring to a lower energy-consuming state (such as standby mode in which the print device is not ready to print and has to be warmed up to the idle mode before printing can commence), assuming that no further job is received in the interim period (which resets the time-out).

In the discussion which follows, the multi-device system will be described in terms of a print system and the devices as printers, however, it is to be appreciated that the system may include other devices, in particular, electromechanical devices.

Figure 1:
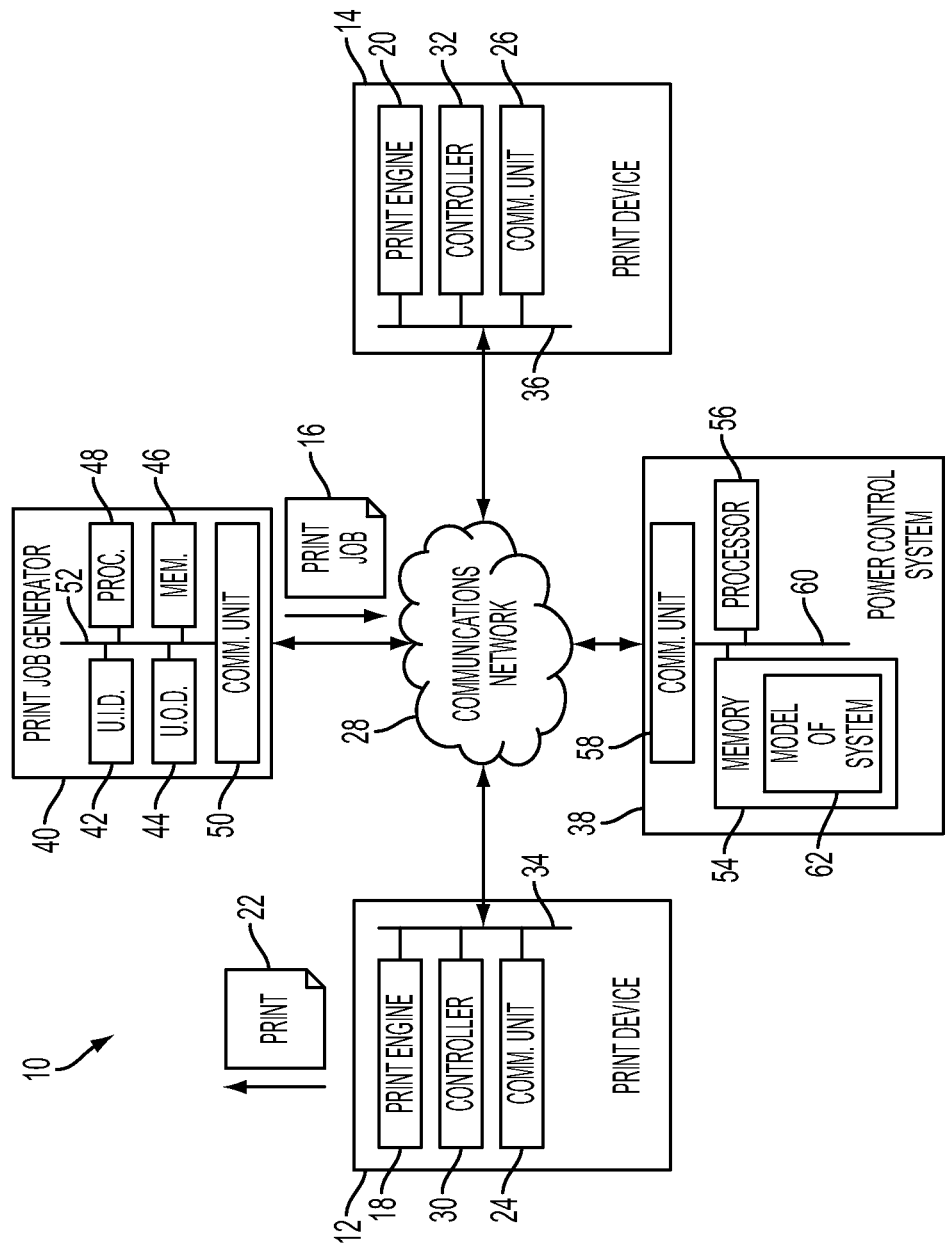
FIG. 1 is a block diagram of a multi-device print system according to aspects of the present disclosure.

With reference to FIG. 1, a multi-device print system 10 includes a plurality of print devices (printers) 12, 14 for executing one or more print jobs 16. A "print job" is a set of one or more related electronic document page images together with a job ticket which includes instructions as to how the print job is to be executed. Suitably, the print devices 12, 14 are relatively close to each other and freely accessible by a set of users in the same area. In some embodiments, the number of print devices 12, 14 does not exceed 10. Each of the print devices 12, 14 includes a print engine 18, 20 for executing the print jobs 16. The print devices 12, 14 can be the same or different and can include standalone print systems or multifunction devices with other capabilities in addition to printing, such as copying, faxing, scanning and combinations thereof. Common types of print engines include xerographic, inkjet, laser and thermal print engines.

In general, when executing the print jobs 16, the print engines 18, 20 apply images to print media, such as paper, using marking materials, such as inks or toners, to yield hardcopy prints 22. In the case of a xerographic print engine, the print engine charges a photoreceptor, in the form of a belt or drum, thereof to a uniform potential and selectively discharges the photoreceptor to create a latent image. The print engine then develops the latent image by applying toner particles of a selected color or colors from a developer housing to the photoreceptor and transferring the latent image to the print media. The transferred image is then fused to the print media with a fuser using heat and/or pressure, thereby yielding a hardcopy print.

Communications units 24, 26, such as modems, of the print devices 12, 14 typically receive the print jobs 16 via a communications network 28, such as a local area network, and receive the print jobs 16 at variable times. For example, some print jobs may arrive at intervals of 1-2 minutes, while others may be many minutes or even hours apart. Upon receiving the print jobs 16, controllers 30, 32 of the print devices 12, 14 add the print jobs 16 to local print queues of the print engines 18, 20 and schedule the print jobs 16 for execution using, for example, a first-in-first-out (FIFO) scheduling algorithm. In some embodiments, a print device receiving one of the print jobs 16 is further awakened from a power saving mode and/or otherwise readied for execution of the print job. The controllers 30, 32 each include a processor executing computer executable instructions on associated memories. The computer executable instructions suitably embody the foregoing functionality, such as the scheduling algorithm. Further, the controllers 30, 32 exchange data with components of the print devices 12, 14, such as the communication units 24, 26 and the print engines 18, 20, via one or more system buses 34, 36.

To reduce power consumption, each of the print devices 12, 14 includes a plurality of different operating modes corresponding to different power consumption levels. For ease of discussion, it is assumed that each print device includes an idle mode and a power saving mode. However, it is to be appreciated that additional operating modes are equally amenable. In an idle mode, a print device is ready to be used for printing and typically requires the most power. In the power saving mode, the print device draws enough power to support certain functions of the print device, but requires a warm up period before it is fully operational again.

The controllers 30, 32 of the print devices 12, 14 switch the print devices 12, 14 from idle mode to power saving mode depending upon time-outs assigned to the print devices 12, 14 by a power control system 38. Typically, the communications units 24, 26 of the print devices 12, 14 receive the time-outs from the power control system 38 via the communications network 28. Further, as is discussed below, the time-outs are optimized to minimize the expected cost to the multi-device print system 10 as a whole, rather than per device. When a print device is in the idle mode and the length of time since a print job was executed exceeds the assigned time-out, the controller of the print device switches the print device to the power saving mode.

One or more print job generators 40 generate the print jobs 16. The print job generators 40 may generate print jobs based on manual input and/or automatically. As to the former, print job generators are associated with users which control generation of print jobs. To facilitate the user generation of print jobs, these print job generators typically each include or are associated with one or more user input devices 42, such as a keyboard, cursor, control device, touch screen, and so on and/or one or more user output devices 44, such as a display. As to the latter, print job generators include software component stored in memories 46, and executed by processors 48, which are pre-programmed to generate print jobs in response to a set of criteria. For example, a software agent may be pre-programmed to print every email received at an inbox.

Each of the print jobs 16 generated by the print job generators 40 includes a selection of one of the print devices 12, 14 to execute the print job. Further, a software agent pre-programmed with a set of one or more rules typically carries out the selection. For example, such rules may specify that all color print jobs use a first print device, and all other print jobs use a second print device or a different print engine of the same device. However, when the print job is manually generated, the selection may be carried out based on manual input using, for example, the user input devices 42. As noted above, users typically select the print device that is best for them individually, without factoring in power consumption considerations.

When a print device is selected, transfer costs for executing the print job on the other print devices are also specified. For example, if a first print device of a two print device system is selected, the transfer cost for executing the print job on the second print device is also specified. The "transfer cost" for the selected print device is assumed to be zero. The transfer costs to other devices typically correspond to one or more of the loss of productivity to the user and print quality as a result of using the other print device(s). Typically, a software component stored in the memories 46, and executed by the processors 48, is pre-programmed with a set of one or more rules for completing the transfer costs. However, when the print job is manually generated, the transfer costs may be specified manually using, for example, the user input devices 42.

The print job generators 40 include the processors 48 executing computer executable instructions stored on the memories 46. The computer executable instructions suitably embody the foregoing functionality, such as the functionality of the software agents. In some embodiments, the print job generators 40 include one or more computers, such as laptop computers, workstation computers, desktop computers, smart phones, personal digital assistants, and the like, or any computing device capable of implementing the exemplary method. The print job generators 40 further includes communication units 50 for communicating with other devices connected to the communications network 28. Components of the print job generators 40, such as the processors 48, the memories 46, the user input devices 42, the user output devices 44, and the communication units 50, communicate via one or more system buses 52.

The power control system 38 aims to reduce power consumption of the multi-device print system 10 by assigning each of the print jobs 16 to a globally optimal print device under the constraints imposed by the print jobs. The globally optimal print device for a print job is the print device which can execute the print job under the print job constraints with the least cost to the multi-device print system 10. Costs taken in to account include power consumption costs (present and/or future) and transfer costs. When no transfer costs are specified, the transfer costs are assumed to be zero. Further, transfers can be disabled when infinite transfer costs are specified. An assignment for a print job is typically determined in response to receiving the print job at the power control system 38.

To determine the globally optimal print device for a print job, a number of approaches may be employed. In some embodiments, the overall system cost is modeled as a function of at least one of a cost of printing on the selected device, including costs associated with waking up the selected print device if it is in a power saving mode, the transfer cost of transferring the print job to a device other than the selected device, and the cost of printing on the transfer device for each of the devices to which the print job could be transferred. The cost function is then optimized (e.g., minimized using a suitable optimization method). In some embodiments, the system cost for each print device is determined and then the print device with the minimum cost can be selected for assignment of the print job. In other embodiments, the assignment decision is modeled using a Markov Decision Process (MDP), as discussed below, which also employs minimization of a cost function. After determining the optimal print device, the print job is assigned to the print device.

The exemplary power control system 38 further reduces power consumption of the multi-device print system 10 by optimizing the time-out for each print device. The optimal time-out for a print device can be computed as the time-out which minimizes the expected power consumption resulting from keeping the print device in idle mode, then possibly putting it in power saving mode and back to idle mode again, until the next print job is assigned to the print device. Notably, the optimal time-out for a print device is not based solely on the stochastic behavior of the demand since the device may receive print jobs through transfers. Typically, the time-outs are determined after assignment of a print job. However, other trigger events are contemplated, such as periodic timer events.

To determine the optimal time-out for each print device, a number of approaches may be employed. In some embodiments, the expected power cost of the multi-device print system 10 is modeled as a function of at least a combination of two or more time-outs, each time-out corresponding to a respective one of the print devices 12, 14 (or at least those print devices in idle mode). The time-out cost function includes the cost of transitioning the print devices between idle mode and power saving mode given at least the demands of the print devices and the expected transfers to the print devices. The expected demands may be determined from known probability distributions for the inter-arrival time of print jobs of the print devices. The expected transfers may be determined from known probability distributions for device selection and, optionally, predicted transfer costs for users. The time-out cost function is then minimized using a suitable optimization method. In other embodiments, the time-out decisions are modeled using an MDP, as discussed below, which also employs minimization of a cost function.

The probability distributions can be generated in a number of different ways. In one method, the requisite data (e.g., inter-arrival data, device selections, and/or transfer costs) are obtained directly from the print devices 12, 14. Alternatively, it may be derived from job tracking data stored and available for retrieval on the print devices 12, 14. Or, the data may be obtained from print servers or client workstations which host the print job generators on which software monitoring the print activity is present. In some embodiments, these probability distributions may vary for different demand states, such as time of day. For example, the demand is likely to be very different at midnight than at noon. Changes in demand state may be determined from probability distributions determined as described above.

The power control system 38 may be embodied in hardware or a combination of software and hardware. In the exemplary embodiment, the power control system 38 includes a memory 54 and a processor 56 in communication therewith. The memory 54 stores instructions for performing the exemplary method, described in further detail hereafter, including optimizing the power consumption of the multi-device print system 10, and which are executed by the processor 56. The power control system 38 further includes a communication unit 58 for communicating with devices connected to the communications network 28. One or more system buses 60 link components of the power control system 38, such as the processor 56, the memory 54, and the communication unit 58. The power control system 38 may be resident, for example, on a server linked to the print devices 12, 14 via the communications network 28. However, in some embodiments, the power control system 38 is integrated with one of the print devices 12, 14 and/or distributed across the print devices 12, 14.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The term "controller," as used herein, is intended to include a processor and a memory. The term "user input device," as used herein, is intended to include one or more of a mouse, a keyboard, a touch screen display, one or more buttons, one or more switches, one or more toggles, and the like. The term "user output device," as used herein, is intended to include one or more of a LCD display, an LED display, a plasma display, a projection display, a touch screen display, and the like. The term "communications network," as used herein, is intended to include one or more of the Internet, a local area network, a wide area network, a wireless network, a wired network, a cellular network, a data bus, such as USB and I2C, and the like. The term "communication unit," as used herein, is intended to include one or more of a modem, Ethernet adapter, WiFi adapter, 3G modem, a cable modem, a DSL modem, and any other adapter or modem facilitating communication with a network.

The term "processor," as used herein, is intended to include one or more of a microprocessor, a microcontroller, a graphic processing unit (GPU), an application-specific integrated circuit (ASIC), a field-programmable gate array (FPGA), and the like. Further, the above described processors, such as the processors 48, 56 of the print job generators 40 and the power control system 56, can each be variously embodied, such as by a single core processor, a dual core processor (or more generally by a multiple core processor), a digital processor and cooperating math coprocessor, a digital controller, or the like. As to the processor 56 of the power control system 38, any device capable of implementing a finite state machine that is in turn capable of implementing the flowchart shown in FIG. 2 can be used.

The term "memory," as used herein, is intended to include one or more of a non-transient computer readable medium; a magnetic disk or other magnetic storage medium; an optical disk or other optical storage medium; a flash memory; a holographic memory; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. In one embodiment, each of the memories above described, such as the memories 46, 54 of the print job generators 40 and the power control system 56, comprises a combination of random access memory and read only memory. Exemplary memory stores instructions for performing the exemplary method and data used and generated therein, as well operating instructions for operating the respective computer.

Figure 2:
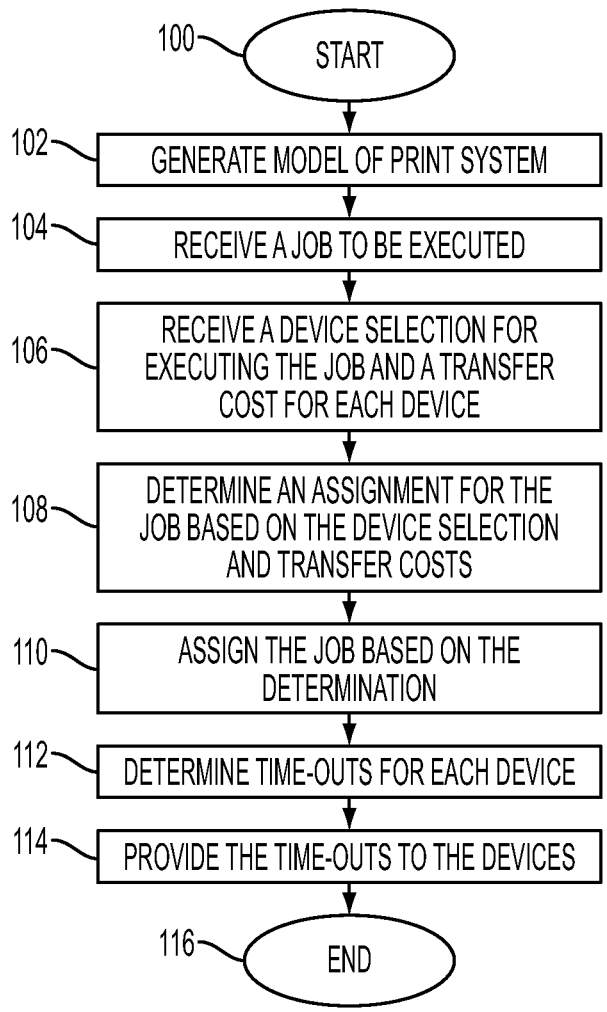
FIG. 2 is a block diagram of a method for reducing power consumption in a multi-device print system.

With reference to FIG. 2, a method for reducing power consumption in a multi-device system which can be used to implement the foregoing approach to reducing power consumption in the multi-device print system 10 is illustrated. The method begins at 100. At 102, a model of the system is generated. A job to be executed is received at 104. Further, a selection of one of the print devices 12, 14 for executing the jobs and a transfer cost for transferring the job 10 to one or more others of the print devices 12, 14 are received at 106. Using a processor, a device to execute the job is determined at 108 through optimization (e.g., minimization) of a first cost function. The first cost function is based on the selection and the transfer costs. The job is assigned at 110 to the determined device, and, using a processor, a time-out for each device in the multi-device system 10 is determined at 112 through optimization (e.g., minimization) of a second cost function. The second cost function is based on an expected power consumption of the system 10. The devices are provided at 114 with the determined time-outs. The method ends at 16, although it is to be appreciated that the method can return to 104 with each new job that is received.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Alternatively, the method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device capable of implementing a finite state machine that is in turn capable of implementing the flowchart shown in FIG. 2 can be used to implement the method.

Further details of the exemplary multi-device print system 10 and method will now be described.

Model of the System

The exemplary print system 10 is modeled as a set of devices, each with costs assigned to it, such as power consumption costs in various states, such as sleep and ready modes, and transfer costs (predetermined and/or user assignable) for transferring jobs between devices. The system model 62 may be stored in memory 54, or elsewhere in the system. The model 64, when input with parameters for a new job to be executed, identifies an optimum solution to a value function (energy cost function) over all devices in the system 10 (i.e., for a plurality of devices capable of performing the job), based on the current states of the devices and their expected future states (based on the expected future demand for jobs to be executed). The solution indicates whether a job should be transferred to another device in the system (and if so, to which device) or be executed on the device to which it is assigned by the job ticket. The exemplary model 64 also computes time-outs for the devices, following the job assignment decision.

One approach for reducing power consumption is to model the multi-device print system 10 as a Markov Decision Process (MDP) with a constrained cost structure. MDPs are typically employed to facilitate decision making by identifying the decision with the least cost. As noted above, power consumption is minimized by determining assignments of print jobs and time-outs for the print devices. Each possible decision takes the multi-device print system 10 to a different system state and each transition to a different system state includes a cost.

The state of the multi-device print system 10 is given by a demand state and a control state. The demand state corresponds to at least one variable affecting demand or load of the multi-device print system 10, such as time of day. It is assumed known and determines the stochastic behavior of two random variables, time to the next job (i.e., inter-arrival time) and user choice of device for that job. The probability distributions for these two random variables are determined as discussed above. The control state corresponds to the operating mode, such as one of an idle mode and a power saving mode, of each print device in the system. As noted above, each operating mode has a different power consumption level.

For each print job, two determinations (or decisions) are made. The first determination is which print device to assign a received print job to and is made prior to assignment by the power control system 38 to a specific device when the print job is received by the power control system 38. Such a determination takes in to account the selected print device as specified in the print job ticket. The second decision is what time-outs should be assigned to the print devices 12, 14. This decision is made by the power control system 38 after assigning a print job. In contrast to the first determination, the selected print device is not taken in to account when making the decision.

The costs incurred by a decision can be of two types. The first type of cost is incurred when a job is assigned and includes the expected cost of transfer, if any, plus the cost of transitioning the assigned print device to the idle mode (if needed). As discussed above, the expected cost of transfer is typically set when the print job is created and can be included in the print job ticket. The second type of cost is incurred when time-outs are set and includes the cumulated cost induced by the time-out on each device in idle mode. The individual cost of a device includes the overhead cost of maintaining the device in idle mode until the time-out or the next job plus the cost of putting the device in to power saving mode if the time-out is actually reached. The cost of maintaining a device in sleep mode or the cost to actually perform the jobs need not be considered as they are incurred whatever the decision.

In one embodiment, the MDP is solved with a value iteration procedure. However, other procedures for solving the MDP are also contemplated. The value iteration procedure is a dynamic programming technique to compute the expected cost to go associated with each state of the system (i.e., the expected cost of the whole sequence of events from that state). Since the expected cost is typically infinite, in one embodiment, the horizon of the sequences is bounded and/or a discount factor is introduced which exponentially or otherwise reduces the contribution of the different steps in the sequence over time. While the use of a bounded horizon can be employed, the solution hereafter employs a discount factor.

One challenge with solving the MDP using the value iteration procedure is in how to compute the value of a state immediately after assignment (i.e., how to determine the time-outs). There are as many variables as there are print devices, where each variable represents the time-out of one device. Further, even when the number of print devices is assumed small (e.g., 10 or less), the solution can still be quite involved and does not have advantageous properties, such as convexity, which would make it amenable to standard numerical optimization methods. In one embodiment, the problem can be solved by reducing the problem to a bounded sequence of one-dimension optimizations.

Value Iteration Method

To solve the MDP using the value iteration procedure and a discount factor, it can be assumed the multi-device print system 10 includes K print devices where each print device k has two operating modes (0 or 1) in which 0 represents a power saving mode, such as a sleep mode, and 1 represents a mode in which more power is consumed than in the power saving mode, such as an idle mode. A binary set of operating modes is chosen for ease of discussion; however, additional modes are also contemplated, such as three, four, or five modes, each with a respective power consumption.

Let each print device k have a power cost rate $\bar{a}_k$ in the idle mode, a power cost rate $\underline{a}_k$ in the sleep (power saving) mode, and a rate of savings $a_k$ when the print device is in the power saving mode. The cost rates $\bar{a}_k$, $\underline{a}_k$, and $a_k$ can each be expressed as a monetary unit per unit time, such as dollars/hour or in other similar units, and can be stored in memory 54. Since power consumption in the power saving mode is less than power consumption in the idle mode, the rate of savings $a_k$ is equal to $\bar{a}_k - \underline{a}_k$. Further, let each print device k have a cost $\check{b}_k$ to transition from idle mode to power saving mode and a cost $\hat{b}_k$ to transition from power saving mode to idle mode. These costs can be expressed in monetary units, as for the cost rates $\bar{a}_k$, $\underline{a}_k$, and $a_k$, and can be stored in memory 54.

A vector $(R_k)_{1:K}$ can be generated in which each component $R_{kh}$ is the cost of transferring a job that was elected to be printed by a device k to a device h. As should be appreciated, this vector corresponds to the transfers costs. When determining the present cost of a job, specified transfer costs can be employed e.g., specified by the submitter of the job 16, e.g., in the job ticket. When determining an expected cost, the transfer costs may be determined probabilistically or based on a system average (over all devices). A component $R_{kh}$ of the vector is assumed to have a value of zero if device k is the same as device h (because there is no transfer cost) and is non-negative otherwise.

The total cost generated by a print device k, initially in idle (ready) mode, that is scheduled to switch to sleep mode after a timeout τ and which is assigned a single job at the beginning of a period x, during the period x includes an uncontrollable cost and an overhead cost $g_k$. The uncontrollable cost includes the job execution cost plus the cost $\underline{a}_k x$ incurred by the device if it were in the most cost efficient mode (i.e., power saving mode) during the whole period. The overhead cost $g_k$ is the cost of maintaining the device in idle mode during a part or the whole of the period x, which is controlled by the time-out τ. The overhead cost $g_k$ for the device k, initially in idle mode and assigned a single job at the beginning of the period x, can therefore be modeled as follows.

$$g_k(x,\tau) \stackrel{def}{=} II[x<\tau]a_k x + II[x \geq \tau](a_k \tau + \check{b}_k) \quad (1)$$

II[condition] returns 1 when the condition in brackets is true and 0 otherwise. Since the uncontrollable cost is static and not affected by the decisions taken, only the overhead cost $g_k$ is considered.

The multi-device print system 10 receives job requests, such as the print jobs 16, in sequence. For the nth print job in the sequence, let $L_n \in \{1:K\}$ be the index of the device that was selected for the print job and let $X_n \in \mathbb{R}^+$ (where $\mathbb{R}^+$ indicates a positive number), be the time elapsed since the previous print job was submitted to the device infrastructure (i.e., the global inter-arrival time). The device $L_n$ that was selected for the nth print job may not be the one which executed it due to a transfer. It is assumed that the random variable $(XL)_n$ follows a probability distribution such as a semi-Markov dynamic controlled by an observed demand state $Z_n$, which exists in an arbitrary space $\mathcal{Z}$ of possible demand states.

It is further assumed that two stationary probability distributions P, Q define the process and are known.

$$p(X_n, L_n | (Z,X,L)_{1:n-1}) = P(X_n, L_n | Z_{n-1}) \quad (2)$$

$$p(Z_n | X_n, L_n, (Z,X,L)_{1:n-1}) = Q(Z_n | X_n, L_n, Z_{n-1}) \quad (3)$$

These equations express the semi-Markov assumption and make explicit the two probability distributions involved. They describe a generative model of the random process, given an initial demand state $Z_0$ as follows:
1 Set n:=1
2 repeat forever:
3 Draw $X_n$, $L_n$ from distribution $P(\cdot | Z_{n-1})$
4 Draw $Z_n$ from $Q(\cdot | X_n, L_n, Z_{n-1})$
5 Set n+=1

"Stationary" means that these distributions P, Q are not influenced by the decisions taken by the power control system 38. They deal only with the external demand, which is assumed independent of the actions of the power control system 38. Overall, the random variable $(Z,X,L)_n$ follows a full Markov dynamics determined by P, Q.

One (poor) choice for the demand state, which intrinsically always satisfies the semi-Markov assumption, is to let $Z_n$ be the whole history of the demand $Z_n = (X,L)_{1:n}$. Then Q is deterministic (i.e., a Dirac distribution): given $X_n = x$, $L_n = l$ and $Z_{n-1} = z$, Q concentrates all the mass of $Z_n$ onto the history z' obtained by appending (x, l) at the end of z. However, the demand space $\mathcal{Z}$ in that case is unmanageable. Hence, the choice of a manageable demand state space $\mathcal{Z}$ and model satisfying the semi-Markov assumptions is application dependent. In the exemplary embodiment, no assumption is made regarding P, Q, which may or may not be deterministic, but it is assumed that they are known.

To model the multi-device print system 10, it is assumed that job execution time is negligible and that a job selected for execution on a device k is assigned immediately as soon as it is received either to device k or to some other device. The state of the multi-device print system 10 at any time is given by a pair $\langle \sigma_{1:K}, z \rangle$, where $\sigma_{1:K}$ is a control state of the system 10 and z denotes the demand state of the system 10. The control state $\sigma_{1:K}$ is a binary vector whose k-th component holds the mode of device k (0 or 1).

In response to receiving a job for execution on one of the devices, two decisions are made. Let h be the selected device's index. The first decision is made immediately upon receipt of the job and is to which device to assign the job. The second decision is made just after the assignment when the system 10 is in state σ. This decision is a family $(\tau_k)_{k \in \sigma}$ of non-negative time-outs, where each $\tau_k$ denotes the time-out for device k (i.e., the time after which device k is to be switched to power saving mode if it has not been assigned a job in between).

Consider the optimization at infinite horizon with discount factor γ. Let $V_h \langle \sigma, z \rangle$ and $V \langle \sigma, z \rangle$ be the optimal expected costs to go from state $\langle \sigma, z \rangle$, respectively before and after the assignment. The optimality equations (i.e., Bellman equations) for these costs are as follows.

$$V_h(\sigma, z) = \min_k R_{hk} + (1 - \sigma_k)\hat{b}_k + V\langle \sigma + (1 - \sigma_k)e_k, z\rangle \quad (4)$$

$$V(\sigma, z) = \min_{(\tau_k)_{k \in \sigma}} \int_{xl} \left[ \sum_{k \in \sigma} g_k(x, \tau_k) + \gamma \int_{z'} V_l\left(\sum_{k \in \sigma} II[x < \tau_k]e_k, z'\right) dQ(z' | zxl) \right] dP(xl | z) \quad (5)$$

$e_k$ denotes a vector of size K with the kth component equal to 1 and the other components equal to 0.

Equation (4) can be explained as follows: if a job for device h is received in state $\langle \sigma, z \rangle$, and that job is sent to device k instead, the expected cost to go includes:

1. $R_{hk}$: the expected transfer cost (null if h=k);
2. $(1-\sigma_k)b_k$: the cost of waking up device k if needed (null if $\sigma_k=1$, i.e., the device is already in idle mode); and,
3. $V\langle \sigma+(1-\sigma_k)e_k, z\rangle$: the expected cost to go from the same demand state z and the new control state in which device k is now in idle mode (identical to $\sigma$ if $\sigma_k=1$, i.e., the device is already in idle mode).

Equation (5) can be explained as follows: if, in state $\langle \sigma, z \rangle$ after the (n−1)-th job has been assigned (hence $Z_{n-1}=z$), the time-outs $(\tau_k)_{k \in \sigma}$ are applied to the idle devices (i.e., those which belong to a), the expected cost to go is the expectation over the random variables $X_n$, $L_n$, $Z_n$ (i.e., the integral over all their possible values x, l, z' with the appropriate distribution defined by Equations (2) and (3)) of the following costs:

1. $\Sigma_{k \in \sigma} g_k(x, \tau_k)$: the total overhead consumption cost induced by the timeouts for each currently idle device, as defined by Equation (1); since this term does not depend on z' it can be taken out of the integral over that variable; and
2. $\gamma V_l(\sigma', z')$: the discounted cost to go from the new state $\langle \sigma', z' \rangle$ when the new job has just been received on device l but not yet assigned; state $\sigma'$ consists of the devices which are still idle when that job is received (i.e., those $k \in \sigma$ for which $\tau_k > x$), which can be written as:

$$\sigma' = \Sigma_{k \in \sigma} II(\tau_k > x) e_k.$$

Reduction of the Optimality Equation

The optimization problem of Equation (5) is transformed by changing the control variable $\tau$. In state $\sigma$, there are $r = \Sigma_k \sigma_k$ devices which need to be assigned a time-out. Equation (5) can be conveniently specified by giving the sorted sequence $\tau'_{1:r}$ of elements in $\tau$, and the injective mapping $v: \{1:r\} \to \{1:K\}$ such that $\sigma_{v_i}=1$ and $\tau_{v_i}=\tau'_i$ for all $i \in \{1:r\}$. The optimization is then reformulated using control variables v, $\tau'$ (for convenience, $\tau'$ is renamed $\tau$).

$$V(\sigma, z) = \min_{(v_i, \tau_i)_{i=1}^r} \int_{xl} \left[ \sum_i g_{v_i}(x, \tau_i) + \gamma \int_{z'} V_l\left(\sum_j II[x < \tau_j]e_{v_j}, z'\right) dQ(z'|zxl) \right] dP(xl|z) \quad (6)$$

It can be observed in Equation (6) that $\tau$ is now a vector with r non decreasing components, and $\sigma$ has disappeared from the objective. It is only present in the constraint that v should be an ordering of the indices of the r non null components of $\sigma$. For a given $\tau$, let $\tau$ be extended with $\tau_0=0$ and $\tau_{r+1}=\infty$. Since $\tau$ is non-decreasing, for all non-negative x, there exists a single $i \in \{1:r+1\}$ such that $\tau_{i-1} \le x < \tau_i$. Furthermore, in that case, for all $j \in \{1:r\}$ it holds that $II[x<\tau_j]=II[i \le j]$. Reformulating the above Equation (6), yields the following:

$$V(\sigma, z) = \quad (7)$$

$$\min_{(v_i, \tau_i)_{i=1}^r} \int_{xl} \left[ \sum_{i=1}^r g_{v_i}(x, \tau_i) + \sum_{i=1}^{r+1} \gamma II[\tau_{i-1} \le x < \tau_i] \int_{z'} V_l\left(\sum_{j=i}^r e_{v_j}, z'\right) dQ(z'|zxl) \right] dP(xl|z)$$

This minimization problem has a discrete component v in a range of size r, and a continuous component $\tau$ in dimension r. However, the objective function is a sum of r+1 terms, each of which involves a limited subset of variables: $\tau_{i-1}$, $\tau_i$ and $(v_j)_{j=i}^r$. This suggests that it can be transformed into a sequence of one-dimensional optimizations. An intermediate value function $V^\bullet \langle t, \sigma, z \rangle$ can be introduced, which is the value function at different steps during that sequence, and has a single extra parameter t (a non negative number) defined backward inductively as follows.

$$V^\bullet \langle t, 0, z \rangle = \int_{xl} \gamma II[t \le x] \int_{z'} V_l \langle 0, z' \rangle dQ(z'|zxl) dP(xl/z) \quad (8)$$

$$V^\bullet \langle t, \sigma \ne 0, z \rangle = \min_{\tau \ge t, k \in \sigma} V^\bullet \langle \tau, \sigma - e_k, z \rangle + \quad (9)$$

$$\int_{xl} \left(g_k(x, \tau) + \gamma II[t \le x < \tau] \int_{z'} V_l \langle \sigma, z' \rangle dQ(z'|zxl)\right) dP(xl/z)$$

For any $\sigma$ (null or non-null), the following holds:

$$V \langle \sigma, z \rangle = V^\bullet \langle 0, \sigma, z \rangle. \quad (10)$$

A value-iteration algorithm for solving the problem can be implemented, as follows.

| Procedure VALUEITERATION: |
| --- |
| 1    Initialize V |
| 2    repeat: |
| 3        Update $V_h$ for each $h \in \{1:K\}$ from V using Equation (4) |
| 4        Update $V^\bullet$ from $(V_l)_{l=1}^K$ using Equations (8) and (9) |
| 5        Update V from $V^\bullet$ using Equation (10) |
| 6    until stability |

The propagations of the value functions can be summarized as follows.

$$V \xrightarrow{(4)} V_{1:K} \xrightarrow{(8)(9)} V^\bullet \xrightarrow{(10)} V$$

Representation of the Solution

One challenge with the foregoing is that the inductive definition of $V^\bullet$ makes the computation of the value at t, $\sigma$, in a given demand state z, dependent on all the values at $\tau$, $\sigma'$ for $\tau \ge t$ and $\sigma' \subseteq \sigma$. There are finitely many $\sigma' \subseteq \sigma$, but infinitely many $\tau \ge t$. A solution to this problem uses a formulation of the equation in terms of operators in a function space rather than point-wise computations. Let $V^\circ$ and v be defined as follows, where $g_\sigma(x,t) = \Sigma_{k \in \sigma} g_k(x, t)$:

$$V^\circ\langle t,\sigma,z\rangle \stackrel{def}{=} \int_{xI} (-g_\sigma(x,t)+\gamma II[t\le x]\int_{z'} V_t\langle \sigma,z'\rangle \, dQ(z'|zxI)) \, dP(xI|z) \quad (11)$$

$$v\langle t,\sigma,z\rangle \stackrel{def}{=} V^\circ\langle t,\sigma,z\rangle - \int_{xI} g_\sigma(x,t) dP(xI|z) \quad (12)$$

Transforming Equations (8), (9), and (10) yields the following.

$$v\langle t, 0, z\rangle = V^\circ\langle t, 0, z\rangle \quad (13)$$

$$v\langle t, \sigma \ne 0, z\rangle = \min_{\tau \ge t}\left(\left(\min_{k \in \sigma} v\langle \tau, \sigma-e_k, z\rangle\right) - V^\circ\langle \tau, \sigma, z\rangle\right) + V^\circ\langle t, \sigma, z\rangle \quad (14)$$

$$V\langle \sigma, z\rangle = v\langle 0, \sigma, z\rangle + \int_{xI} g_\sigma(x,0) \, dP(xI|z) \quad (15)$$

The purpose of this transformation is that now, the pointwise equations can be translated in a compact way into the following functional equations.

$$v\langle \cdot, 0, z\rangle = V^\circ\langle \cdot, 0, z\rangle \quad (16)$$

$$v\langle \cdot, \sigma \ne 0, z\rangle = \downarrow\left(\left(\min_{k \in \sigma} v\langle \cdot, \sigma-e_k, z\rangle\right) - V^\circ\langle \cdot, \sigma, z\rangle\right) + V^\circ\langle \cdot, \sigma, z\rangle \quad (17)$$

The notation $f(\cdot, p)$ is used here to denote the function $t \to f(t,p)$, where p is some parameter or tuple thereof. Operator $\downarrow$ on functions is defined as follows:

$$\downarrow f(g) \stackrel{def}{=} \min_{\tau \ge t} f(t) \quad (18)$$

The propagations of the value functions can now be summarized, in the general case, as $$V \xrightarrow{(4)} V_{1:K} \xrightarrow{(11)(12)} V^\circ \xrightarrow{(16)(17)} v \xrightarrow{(15)} V,$$

(the numbers in parentheses indicating the equations used) with the following equations.

$$V_h(\sigma, z) = \min_k R_{hk} + (1-\sigma_k)\hat{b}_k + V\langle \sigma + (1-\sigma_k)e_k, z\rangle \quad (19)$$

$$V^\circ\langle t, \sigma, z\rangle = \int_{xI} \left(-g_\sigma(x,\tau) + \gamma II[t \le x] \int_{z'} V_t\langle \sigma, z'\rangle \, dQ(z'|zxI)\right) dP(xI/z) \quad (20)$$

$$v\langle \cdot, 0, z\rangle = V^\circ\langle \cdot, 0, z\rangle \quad (21)$$

$$v\langle \cdot, \sigma \ne 0, z\rangle = \downarrow\left(\left(\min_{k \in \sigma} v\langle \cdot, \sigma-e_k, z\rangle\right) - V^\circ\langle \cdot, \sigma, z\rangle\right) + V^\circ\langle \cdot, \sigma, z\rangle \quad (22)$$

$$V\langle \sigma, z\rangle = v\langle 0, \sigma, z\rangle + \int_{xI} g_\sigma(x,0) \, dP(xI|z) \quad (23)$$

Given z, let $\mathcal{F}^\circ$ be the (finite) set consisting of the initial functions $V^\circ\langle t, \sigma, z\rangle$ for all $\sigma$. A computable function space $\mathcal{F}$ is identified which includes the following properties.

$$(A)\begin{cases} \forall f \in F^\circ & f \in F \\ \forall f \in F & \min(f,g) \in F \\ \forall f \in F, g \in F^\circ & \downarrow(f-g)+g \in F \end{cases} \quad (24)$$

Given such a space, $v\langle t, \sigma, z\rangle \in \mathcal{F}$ can be constructed inductively in $\mathcal{F}$ using Equations (16) and (17), and V can finally be computed from v. If there is no obvious space $\mathcal{F}$ satisfying $(\mathcal{A})$, then $\mathcal{F}$ can be chosen a priori. In that case, the elements of $\mathcal{F}^\circ$ and the operators $\min(f,g)$ and $\downarrow(f-g)+g$ are replaced by approximations which satisfy $(\mathcal{A})$. A typical example of such an a priori space where approximations are possible is the space of piecewise constant functions.

Choice of the Solution Function Space

To choose the function space, let $\mathcal{F}^c$ be the set of functions of the form $f+r1$ where $f \in \mathcal{F}^\circ$ and r is any scalar. Further, let $\mathcal{F}^*$ be the space of functions which are piecewise $\mathcal{F}^c$ (i.e., of the form $\Sigma_{k \in K} 1_{A_k} f_k$, where $(f_k)_{k \in K}$ is a finite family of functions in $\mathcal{F}^c$ and $(A_k)_{k \in K}$ is an interval partition of the set of real positive numbers $\mathbb{R}^+$). If the following assumptions hold:

$$(A^*)\begin{cases} \forall f, g \in F^c & \min(f,g) \in F^* \\ \forall f, g \in F^c & \forall T > 0 \downarrow (1_{[0,T)}(f-g))+g \in F^* \end{cases} \quad (25)$$

then it can be shown that $\mathcal{F}^*$ satisfies Assumption $(\mathcal{A})$ and is amenable to the treatment described above. Note that in $(\mathcal{A}_2^*)$, T may be equal to $+\infty$. Now, observe that Assumption $(\mathcal{A}^*)$ is rather mild. Indeed, consider two functions $f, g \in \mathcal{F}^c$ and let $h=f-g$. Let $=_I$ denote the (equivalence) relation which holds between two functions when they coincide on a given interval I.

Figure 3:
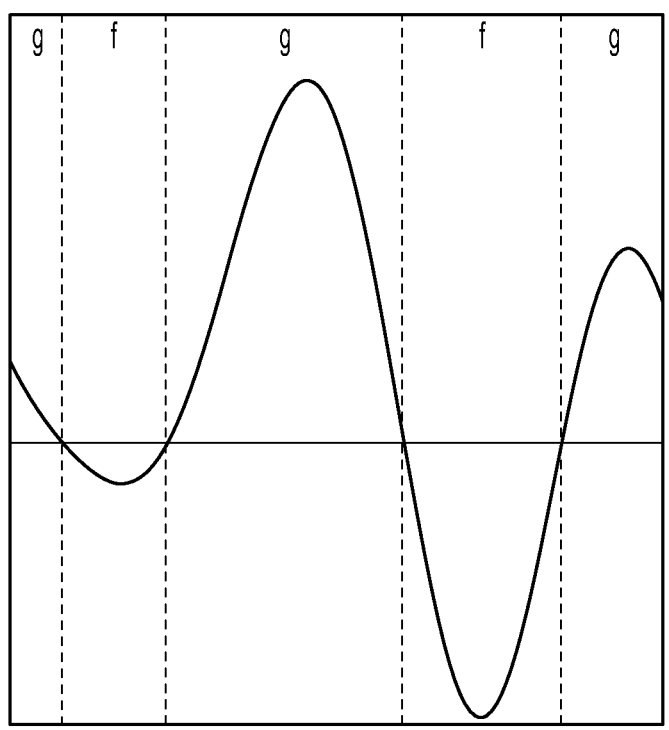
FIG. 3 is a graphical illustration of the computation of an operator.

Assumption $(\mathcal{A}^*_1)$ holds if $II[h(t) \ge 0]$ is piecewise constant in t (i.e., there is an interval partition of $\mathbb{R}^+$, such that h is either uniformly negative or uniformly non negative on each interval). Indeed, if h is negative on an interval I, then $\min(f,g)=_I f \in \mathcal{F}^c$, and if h is non negative on the interval I, then $\min(f,g)=_I g \in \mathcal{F}^c$. Therefore, $\min(f,g)$ is piecewise $\mathcal{F}^c$ and in $\mathcal{F}^*$. Furthermore, the boundaries of the intervals of the partition can be computed: they are either discontinuity points of h or points where $h(t)=0$. See FIG. 3 for an illustration of computing $\min(f,g)$.

Assumption $(\mathcal{A}^*_2)$ also holds if h has only finitely many discontinuities and $II[\exists \tau > t \, h_T(\tau) < h_T(t)]$ is piecewise constant in t, where $h_T = 1_{[0,T)} h$. Indeed, consider an interval I where it is constant. One of these intervals is $I=[T, +\infty)$ on which $h_T=_I 0$ and hence $\downarrow h_T+g=_I g \in \mathcal{F}^c$. Now assume that $I \subset [0,T)$. Without loss of generality, assume that h is continuous on I (otherwise split I at the discontinuities). If for all $t \in I$ and $\tau > t$ it is true that $h_T(\tau) \ge h(t)$, then $\downarrow h_T(t)=h(t)=f(t)-g(t)$ and hence $\downarrow h_T+g=_I f \in \mathcal{F}^c$. If, on the other hand, for all $t \in I$ there exists $\tau > t$ such that $h_T(\tau) < h(t)$, then it is easy to show that $\downarrow h_T$ must be constant on I.

Figure 4:
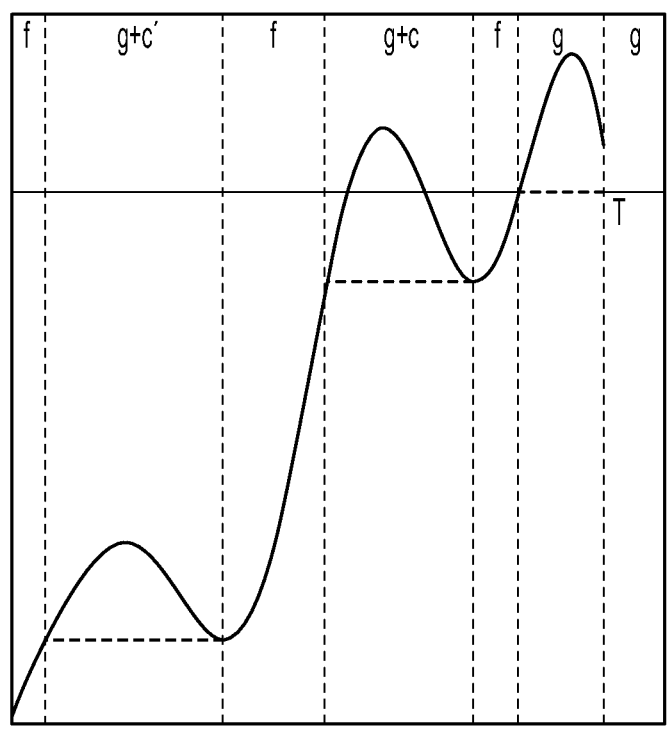
FIG. 4 is a graphical illustration of the computation of an operator.

Hence, $\downarrow (1_{[0,T)}(f-g))+g$ is piecewise $\mathcal{F}^c$ and hence in $\mathcal{F}^*$. The boundaries of the intervals are slightly more difficult to compute. It essentially requires the identification of the discontinuities of h, its local minima, and the points at which the value of a local minimum is reached. See FIG. 4 for an illustration of computing $\downarrow (1_{[0,T)}(f-g))+g$.

Implementation

If Assumption $(\mathcal{A}^*)$ holds, all the computation in $\mathcal{F}^*$ needed to obtain $v(t, \sigma, z)$ can be done in the space $\Delta \mathcal{F}^\circ$ of functions of the form $V^\circ\langle t, \sigma', z\rangle - V^\circ\langle t, \sigma'', z\rangle$ with $\sigma', \sigma'' \subset \sigma$ (difference of initial functions). And this computation can be entirely based on two procedures SIGN(h,r) and GLMB(h,r), where h∈Δ$\mathcal{F}$° and r∈$\mathbb{R}$. The term GLMB means "greatest lower monotonic bound".

Both procedures return a finite interval partition of the real positive numbers $\mathbb{R}^+$. For each interval I in the partition, SIGN(h,r) returns an indicator +1 if $1_I$(h−r1)≥0 or −1 if $1_I$(h−r1)≤0. Further, for each interval I in the partition, GLMB(h,r) returns a constant scalar c such that $\downarrow(1_I$(h−r1))=$_I$c if it is indeed constant, or a special indicator ⊥ if $\downarrow(1_I$(h−r1))=$_I$h−r1. Note that both procedures are considered "homogeneous" in a loose sense. For any constant α, SIGN(αh, αr) and GLMB(αh, αr) can be derived from SIGN(h, r) and GLMB(h, r), respectively. Strictly speaking, this may not seem so obvious with procedure GLMB when α<0, but a slightly more symmetrical definition of that procedure, omitted here for clarity sake, makes it fully homogeneous.

Assuming (to simplify) that all functions in $\mathcal{F}$° are continuous, both procedures can, in turn, be implemented using a BEHAVIOR(h) procedure, where h∈Δ$\mathcal{F}$°, and an EVAL(h, t) procedure, where h∈$\mathcal{F}$° and t∈$\mathbb{R}^+ \cup \{+\infty\}$. BEHAVIOR(h) returns a finite interval partition of $\mathbb{R}^+$ and, for each interval I of the partition, an indicator +1 if h is non-decreasing and an indicator −1 if h is non-increasing. EVAL(h, t) returns the value h(t) or the asymptote of h if t=+∞. For example, SIGN(h, r) can be implemented as shown hereafter with the following algorithm.

| | Procedure SIGN (h, r): |
|---|---|
| 1 | Let P be the empty interval partition |
| 2 | Let T := +∞ |
| 3 | Let s be the sign (+1 or −1) of EVAL(h, T) − r |
| 4 | Foreach interval [u, v] in BEHAVIOUR(h) in decreasing order: |
| 5 |    Let s' be the sign (+1 or −1) of EVAL(h, u) − r |
| 6 |    if s ≠ s': |
| 7 |       Compute the root t of h − r1 on [u, v) by bi-section |
| 8 |       Append interval [t, T) to P with indicator s |
| 9 |       Let s := s' and T := t |
| 10 | Append interval [0, T) to P with indicator s |
| 11 | Return P |

At line 6, if the condition is satisfied, h−r1 changes sign over [u, v) and since, by definition of procedure BEHAVIOR, it is monotonic over this interval, the root is unique. It is computed at line 7 by bi-section, which only relies on the available low order predictor EVAL. However, it is to be appreciated that the computation of the root at line 7 can be performed by any numerical or analytical method. For example, the root can be computed using higher order predictors, such as in the Newton-Raphson method. Such methods can also be optimized if procedure BEHAVIOR(h) can associate additional information with each interval I of the partition it returns. For example, convexity behavior may be used to optimize the Newton-Raphson method, but of course, the partition itself may need to be refined as monotonicity and convexity are likely not to co-occur on the same intervals. The steps of Procedure SIGN are easy to follow on FIG. 3. A similar stepwise definition of Procedure GLMB can be devised by observing FIG. 4.

Initialization of the Model

With some further assumptions on the distributions driving the demand, the functions in $\mathcal{F}$° have a regular form which simplifies their analysis.

$$(A°) \begin{cases} P(xl|z) = P(x|z)P(l|z) \\ Q(z'|zxl) = Q(z'|zl) \end{cases} \quad (26)$$

x and l are independent given z, and z' is independent of x given zl. Under assumption ($\mathcal{A}$°), it can be shown that V°⟨t, σ, z⟩ is of the following form:

$$V°⟨t,\sigma,z⟩ = -a_\sigma \psi(t|z) + (-\check{b}_\sigma + \gamma \Sigma_l P(l|z) \int_{z'} V_l⟨\sigma,z'⟩ dQ(z'|zl))\psi'(t|z), \quad (27)$$

where $a_\sigma = \Sigma_{k\in\sigma} a_k$, $\check{b}_\sigma = \Sigma_{k\in\sigma} \check{b}_k$ and ψ, ψ' are defined as follows:

$$\psi(t|z) \stackrel{def}{=} \int_x \min(t, x) dP(x|z) \quad (28)$$

$$\psi'(t|z) \stackrel{def}{=} \int_x II[t \le x] dP(x|z) \quad (29)$$

Note that ψ' is indeed the derivative of ψ wherever the former is continuous. Equation (34) means that the solution space Δ$\mathcal{F}$° is included in the function space spanned by ψ(•|z), ψ'(•|z). Since procedures SIGN and GLMB are homogeneous, it is sufficient to know how to compute them for functions of the form ψ+cψ' or ψ' alone.

EXAMPLES

Hereafter described are a few examples that have special properties that simplify decision making.

1. Single Device

Suppose the system 10 includes only a single print device. As will be appreciated, this example demonstrates the applicability of the method and is not intended to represent the exemplary multi-device system. In such a system, there is no alternative for job assignment. Further, there are only two control states 0 and 1, but only state 1 is of interest since power saving mode needs only to be scheduled just after assignment (i.e., when the single device is in idle mode). The optimization problem then simplifies to the following equations. The propagation of the value functions can be summarized as V→V.

$$V⟨1, z⟩ = \left(\min_t \int_x (g(x, t) + \gamma II[t \le x]\hat{b}) dP(x|z)\right) + \gamma \int_{xz'} V⟨1, z'⟩ dQ(z'|zx) dP(x|z) \quad (30)$$

$$V⟨0, z⟩ = \gamma\left(\check{b} + \int_{xz'} V⟨1, z'⟩ dQ(z'|zx) dP(x|z)\right) \quad (31)$$

It can be observed that in a given demand state z, the minimization problem above does not depend on distribution Q and is outside the integral over the possible subsequent states. In other words, optimization can be made in each demand state independently, and only at a one-step horizon. The actual computation of the value function is of no interest and the optimal time-out schedule in a given demand state z is directly obtained by the minimization objective above, which can be rewritten as (omitting z) follows.

$$t^* = \operatorname*{argmin}_{t \ge 0} a\psi(t) + (\check{b} + \gamma\hat{b})\psi'(t) \quad (32)$$

Hence, the following holds.

$$\frac{f(t^*)}{1-F(t^*)} = \frac{a}{\check{b}+\gamma\hat{b}} \quad (33)$$

Equation (33) is simply obtained by annulling the derivative of the objective, assuming that distribution P has a density $f$ (i.e., $dP(x)=f(x)dx$), and F is its cumulated density.

2. Memoryless Process

In this example, it is assumed that P is an exponential under a single demand state, and hence Q is trivial and the demand state can be omitted in the expressions. P can be represented as follows.

$$dP(x) = \lambda \exp(-\lambda x) dx \quad (34)$$

$$P(l) = \pi_l \quad (35)$$

where $\Sigma_l \pi_l = 1$.

This assumes that job requests arrive according to a Poisson distribution process of rate $\lambda$ and each request is independently dispatched according to a multinomial of parameter $\pi$ over the devices. Alternatively, and equivalently, requests to any one device I arrive according to a Poisson distribution process of rate $\lambda \pi_l$ and devices are independent. Assumption ($\mathcal{A}^\circ$) holds yielding:

$$\psi(t) = \exp(-\lambda t) \quad (36)$$

$$\psi'(t) = \frac{t}{\lambda}(1 - \exp(-\lambda t)) \quad (37)$$

$$V^\circ\langle t, \sigma \rangle = -\frac{a_\sigma}{\lambda} + \underbrace{\left(\frac{a_\sigma}{\lambda} - \check{b}_\sigma + \gamma \sum_l \pi_l V_l\langle\sigma\rangle\right)}_{\omega(\sigma)} \exp(-\lambda t) \quad (38)$$

Note that the constant $-a_\sigma/\lambda$ can be dropped in $V^\circ$, because it is null when $\sigma=0$ and irrelevant otherwise, as can be seen from Equation (17). Hence space $\Delta\mathcal{F}^\circ$ is included in the unidimensional function space spanned by $\exp(-\lambda t)$ only.

For any scalar a it can be shown that:

$$\downarrow(a\exp(-\lambda t)) = \min(a,0)\exp(-\lambda t) \quad (39)$$

This leads to the following simplified equations.

$$V_h\langle\sigma\rangle = \min_k R_{hk} + (1-\sigma_k)\hat{b}_k + V\langle\sigma + (1-\sigma_k)e_k\rangle \quad (40)$$

$$V\langle\sigma\rangle = \min_{\sigma' \subset \sigma}\left(\sum_{k\in\sigma'}\frac{a_k}{\lambda} + \sum_{k\in\frac{\sigma}{\sigma'}}\check{b}_k + \gamma\sum_l \pi_l V_l\langle\sigma'\rangle\right) \quad (41)$$

The propagation of the value functions in the case of a memoryless process can be summarized as $V \to V_{1:K} \to V$ with Equations (40) and (41).

If V, $V_{1:K}$ satisfy these equations, then an optimal control is obtained as follows:

In state $\langle\sigma\rangle$ upon receiving a job request on device h, assign it to device k such that the minimum in Equation (40) is reached at k.

In state $\langle\sigma\rangle$ after assignment, find the value of the control state of the system ($\sigma' \subset \sigma$) such that the minimum of Equation (41) is reached at $\sigma'$, and schedule a switch to sleep mode at $\tau_k=\infty$ for all the devices that are currently in the mode corresponding to that state ($k\in\sigma'$) and $\tau_k=0$ for all the other devices not in the mode corresponding that state ($k\in\sigma/\sigma'$).

3. Partially Revealed Process

The distributions P and Q are the drivers of the demand process. Given a sequence $(x_i, l_i, z_i)_{i=1}^N, z_{N+1}$, consider the variant of the demand process driven by distributions P' and Q' as follows. The variant state space is $\mathcal{Z}' = \mathcal{Z} \uplus \{1: N\}$ and for all $i \in \{1: N\}$:

(1) P'(t|i) concentrates all the mass on $(x_i, l_i)$. Furthermore P'(t|z)=P(t|z) for $z\in\mathcal{Z}$.

(2) Q'(t|i|xl) does not depend on xl and concentrates all the mass on state i+1, where, to simplify notations, a state N+1 identified with $z_{N+1}\in\mathcal{Z}$ is introduced. Furthermore Q'(t|z, x, 1)=Q(t|z, x, 1) for $z\in\mathcal{Z}$.

In other words, P', Q' drive a process in which the N first items are prescribed, and the remainder is driven by P, Q. The optimal value functions at a demand state $z\in\mathcal{Z}$ are identical under the original process P, Q and its variant P', Q'. Therefore only the prescribed demand states $i\in\{1: N\}$ are of interest. At these states, assumption $\mathcal{A}^\circ$ holds and yields the following.

$$\psi'(t|i) = II[t \le x_i] \quad (42)$$
$$\psi(t|i) = \min(t, x_i) = x_i + (t-x_i)II[t \le x_i]$$

$$V^\circ\langle t, \sigma, i\rangle = -a_\sigma x_i + \underbrace{\left(-a_\sigma(t-x_i) - \check{b}_\sigma + \gamma V_{l_i}\langle\sigma, i+1\rangle\right)}_{\omega_i(t,\sigma)} II[t \le x_i] \quad (43)$$

For any non-decreasing function $f$, it can be shown that:

$$\downarrow(f II[t\le x_i]) = \min(f, 0) II[t\le x_i] \quad (44)$$

This leads to the following simplified equations.

$$V_h\langle\sigma, i\rangle = \min_k R_{hk} + (1-\sigma_k)\hat{b}_k + V\langle\sigma + (1-\sigma_k)e_k, i\rangle \quad (45)$$

$$V\langle\sigma, i\rangle = \min_{\sigma'\subset\sigma}\left(\sum_{k\in\sigma'} a_k x_i + \sum_{k\in\frac{\sigma}{\sigma'}}\check{b}_k + \gamma V_{l_i}\langle\sigma', i+1\rangle\right) \quad (46)$$

The propagation of the value functions for the partially revealed case can then be summarized as $V \to V_{1:K} \to V$ with Equations (45) and (46).

If V, $V_{1:K}$ satisfy these equations, then an optimal control is obtained as follows:

In state $\langle\sigma, i\rangle$ upon receiving a job request for device h, assign it to device k such that the minimum in Equation (46) is reached at k.

In state $\langle\sigma, i\rangle$ after assignment, find $\sigma' \subset \sigma$ such that the minimum in Equation (47) is reached at $\sigma'$, and schedule a switch to sleep mode at $\tau_k=\infty$ for all the devices $k\in\sigma'$ and $\tau_k=0$ for all the devices $k\in\sigma\setminus\sigma'$.

4. Weibull Demand

In this example, P is considered to be a Weibull distribution under a single demand state, and hence Q is trivial and the demand state can be omitted in the expressions. P can be represented as follows:

$$dP(x) = \lambda\kappa(\lambda x)^{\kappa-1}\exp(-(\lambda t)^\kappa) dx \quad (47)$$

$$P(l) = \pi_l \quad (48)$$

where $\Sigma_l \pi_l = 1$.

Further, assumption ($\mathcal{A}^\circ$) holds leaving the following.

$$\psi'(t) = \exp(-(\lambda t)^\kappa) \qquad (49)$$

$$\psi(t) = \frac{1}{\lambda \kappa} \gamma\left(\frac{1}{\kappa'}(\lambda t)^\kappa\right) \qquad (50)$$

$$V^\circ\langle t, \sigma\rangle = -\frac{a_\sigma}{\lambda}\underbrace{\frac{1}{\kappa}\gamma\left(\frac{1}{\kappa'}(\lambda t)^\kappa\right)}_{\psi(\lambda t)} + (-b_\sigma + \sum_l \pi_l V_l\langle\sigma\rangle)\underbrace{\exp(-(\lambda t)^\kappa)}_{\psi'(\lambda t)} \qquad (51)$$

$\gamma$ denotes the incomplete Gamma function and $\Psi$ the function $$\frac{1}{\kappa}\gamma\left(\frac{1}{\kappa'}(\cdot)^\kappa\right)$$

Figure 5:
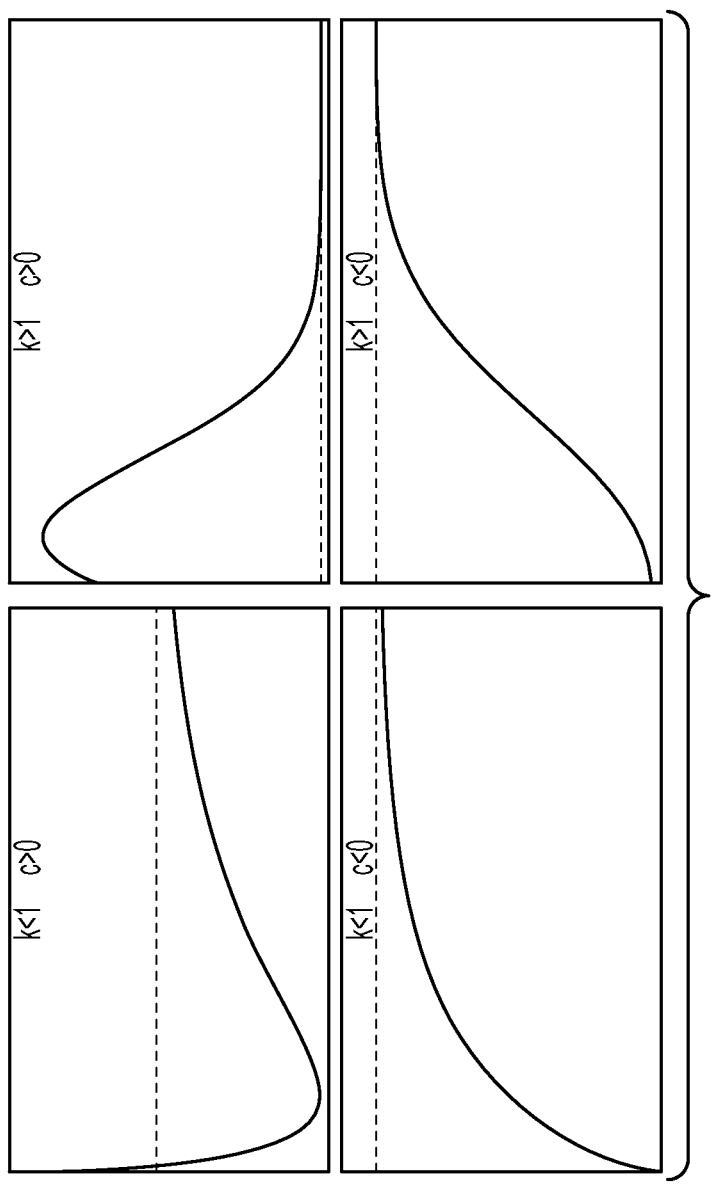
FIG. 5 is a graphical illustration of the different shapes for functions of a function space.

(thus depending only on $\kappa$). Up to rescaling, the functions in $\Delta\mathcal{F}^\circ$ are of the form either $\Psi'$, which has an exponential-like shape, or $\Psi + c\Psi'$, which can assume the different shapes shown in FIG. 5 and have the following characteristics when $\kappa \neq 1$:

(1) They are always continuous, have value c at 0, and have a limit at infinity given by $$\frac{1}{\kappa}\Gamma\left(\frac{1}{\kappa}\right).$$

(2) They are monotonically increasing if $c \leq 0$, otherwise they have a single local optimum, at $$t^* = \left(\frac{1}{c\kappa}\right)^{\frac{1}{\kappa-1}},$$

which is a maximum if $\kappa > 1$ and a minimum if $\kappa < 1$.

(3) They are concave if $c \leq 0$ and $\kappa < 1$, otherwise they have a single inflection point solution of the simple polynomial equation $$1 - \frac{1}{\kappa} + \frac{1}{c\kappa}t - t^\kappa = 0.$$

Here the equations do not simplify, but primitives BEHAVIOR and EVAL are easy to compute. Hence, procedures SIGN and GLMB, and hence the function $v\langle\cdot, \sigma\rangle$ and the scalars $V_k\langle\sigma\rangle$ for each control state a satisfying Equations (19)-(23), are easy to compute. All the functions are represented (piecewise) simply by two coefficients, those of $\Psi$ and $\Psi'$ in the space they span. The optimal control can then be obtained as follows. In state $\langle\sigma\rangle$ upon receiving a job request on device h, assign it to device k such that the minimum in Equation (4) is reached at k. In state $\langle\sigma\rangle$ after assignment, find the sequence of elements of $\sigma$ and matching timeout values $\tau$ at which the minimum in Equation (14) is reached, using Equation (13) with t=0 as initialization, reporting the value of $\tau$ at each step in the sequence as the value of t in the next step.

5. Other Demand Distributions

Many other demand distributions can be handled in the same way as the Weibull distribution example above. The distribution examples above include the following: there is a single demand state (hence Q is trivial and the demand state can be omitted in the expressions); and ($\mathcal{A}^\circ$) holds, which essentially means that demand generates independently the global job flow and then dispatches each job still independently according to a fixed multinomial among the devices. Function $\psi'$ is essentially the complementary cumulative distribution function associated with P and often has an analytic form. Function $\psi$ is obtained by integration of $\psi'$. If an analytic form is available for $\psi$, as in the Weibull case, then the computation of primitives BEHAVIOR and EVAL for the functions of interest, of the form $\psi + c\psi'$, can be solved either analytically or using some simple numerical methods (in one dimension). If $\psi$ does not have an analytic form, it can still be computed pointwise by approximation of the integral, and plugged into a numerical method.

Without intending to limit the scope of the exemplary embodiment, the following example experiments illustrate the applicability of the method.

EXPERIMENTS

1. Simulated Demand Experiment

An experiment was performed using simulated demand. This experiment included the following steps: (i) choose a distribution P for which $\psi$ and $\psi'$ have an analytic form, as well as some arbitrary multinomial distribution $\pi$ for dispatch; (ii) generate N demand sequences of length T accordingly, starting at some given demand state; (iii) compute the value functions of various policies under demand P, $\pi$; (iv) for each of the N sequences, compute the variant of each policy when that sequence is revealed; (v) compute the costs generated by the two kinds of policies (non-revealed and revealed) at each of the T steps; and (vi) average the costs over the N sequences. The resulting T (cumulated) costs can be plotted, showing, for each policy, the regret between that policy when the future up to T is known and when it is not known. In all cases, the revealed policy is expected to perform not worse than the original one.

Two policies were employed, the transfer policy, which is the optimal policy computed as described above, and the selfish policy, in which each device separately implements its own optimization independently of the others (as for the single device case above). The selfish policy is not easy to compute from the global demand. Indeed, the global demand process induces device specific demand processes which may be very different from the global one, and may not be easily computable. In general, the demand process for device l is obtained as an infinite mixture with geometric weights $\pi_l(1-\pi_l)^n$ of self-convolutions of order n of the global demand. However, in the case of an exponential global demand with rate $\lambda$, computations simplify and the individual device demand for device l is also exponential with rate $\pi_l\lambda$. In that case, comparing the two policies transfer and selfish is possible.

Figure 6:
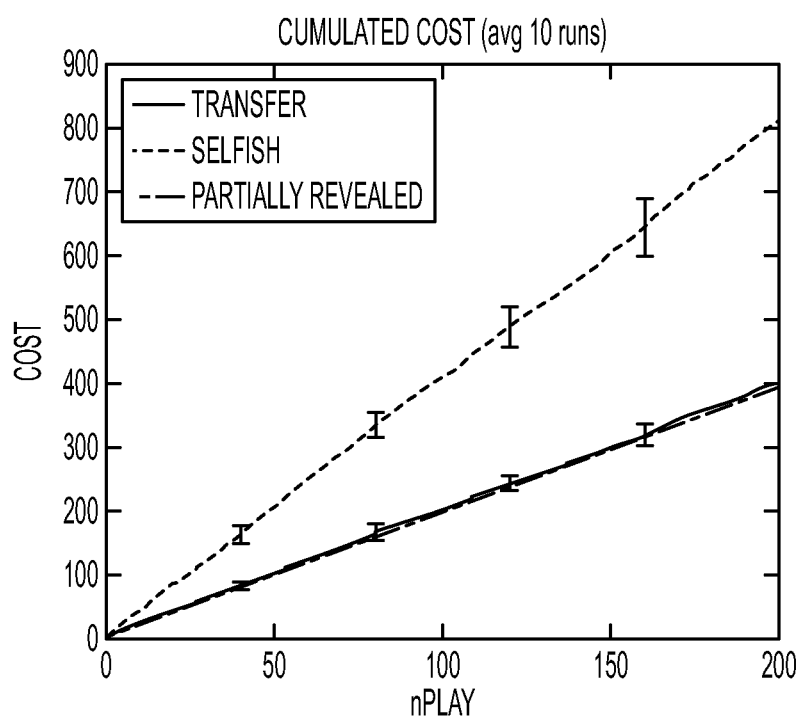
FIG. 6 is a graphical illustration of the cumulated costs of two polices for a simulated, exponential demand and low transfers costs.
Figure 7:
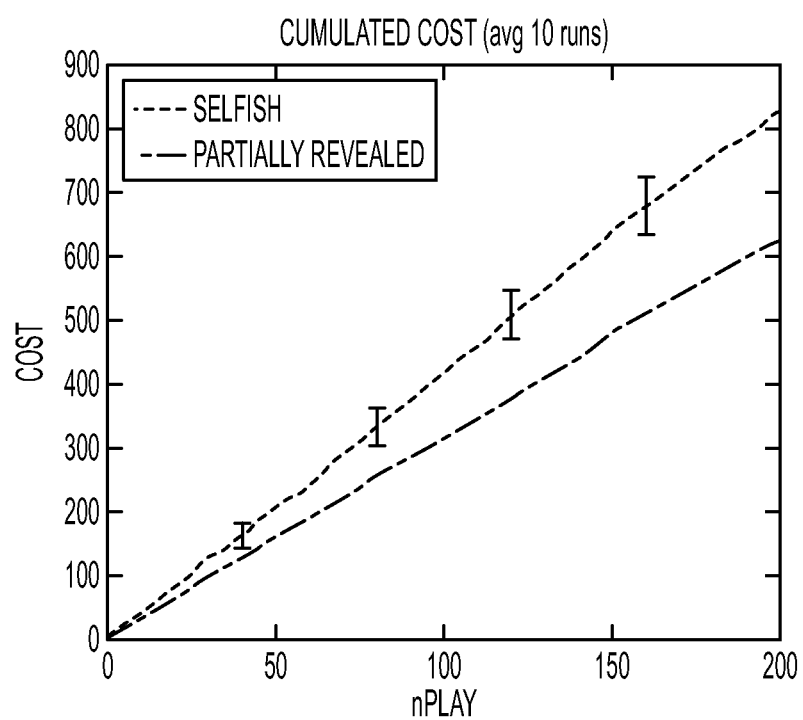
FIG. 7 is a graphical illustration of the cumulated costs of two polices for a simulated, exponential demand and high transfers costs.
Figure 8:
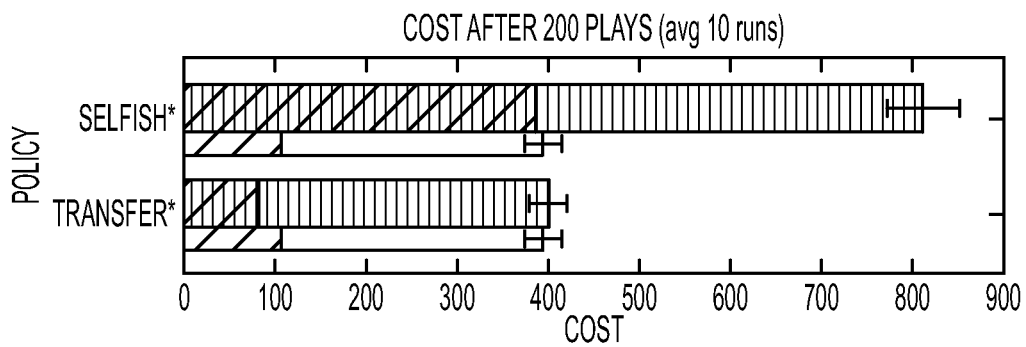
FIG. 8 is a graphical illustration of the split of costs between assignment costs and time-out costs of two polices for a simulated, exponential demand and low transfers costs.
Figure 9:
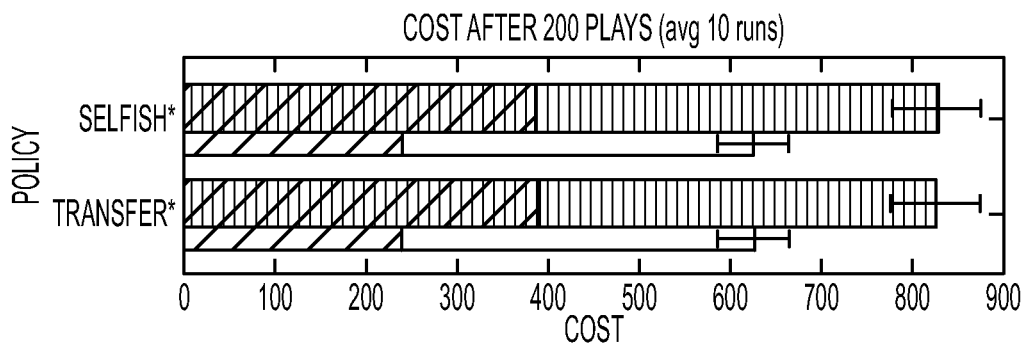
FIG. 9 is a graphical illustration of the split of costs between assignment costs and time-out costs of two polices for a simulated, exponential demand and high transfers costs.

The results are shown in FIGS. 6-9. The plots of FIGS. 6 and 7 show the cumulated cost for the two policies with low transfer costs and high transfer costs, respectively. With reference to FIG. 6, the solid line corresponds to the transfer policy, the dashed line corresponds to the selfish policy, and the short-dashed-long-dashed line corresponds to the partially revealed variant for both the selfish policy and the transfer policy (i.e., cumulated costs are the same). With reference to FIG. 7, the dashed line corresponds to both the selfish policy and the transfer policy (i.e., cumulated costs are the same). The short-dashed-long-dashed line corresponds to the partially revealed variant for both the selfish policy and the transfer policy (i.e., cumulated costs are the same). In theory, there is one such variant for each original policy, but they are almost identical and undistinguishable on the plots. More precisely, the two variants differ slightly at the end of the sequence, when the original policies are prominent, but this difference is quickly erased at earlier steps in the sequence, where the knowledge of the actual demand takes over. The plots of FIGS. 8 and 9 detail the split of the cost at the end of the sequence between assignment cost (transfer—if allowed—plus wake up cost) and time-out cost (energy consumption in ready mode plus switch to sleep mode) for low transfer costs and high transfer costs, respectively. The assignment cost is shown as a hashed rectangle. The filled bar (identified by vertical lines) is for the original policy, the white bar for its partially revealed variant.

2. Real Demand Experiment

Another experiment was performed using real demand data. This experiment included the following steps: (i) fit a global demand model to the data; (ii) compute the value function of the transfer policy under this demand model; (iii) for each of the devices, fit an individual demand model to the data corresponding to that model; (iv) and compute the value function of the selfish policy under that demand model assuming the device is alone; and (v) compute the costs of the transfer and selfish policies on the available data. The main difference with simulated data is that here, the global demand model and the individual ones for each device can be chosen from the same family (e.g., Weibull), as they are most likely to both be non-exact anyway.

Figure 10:
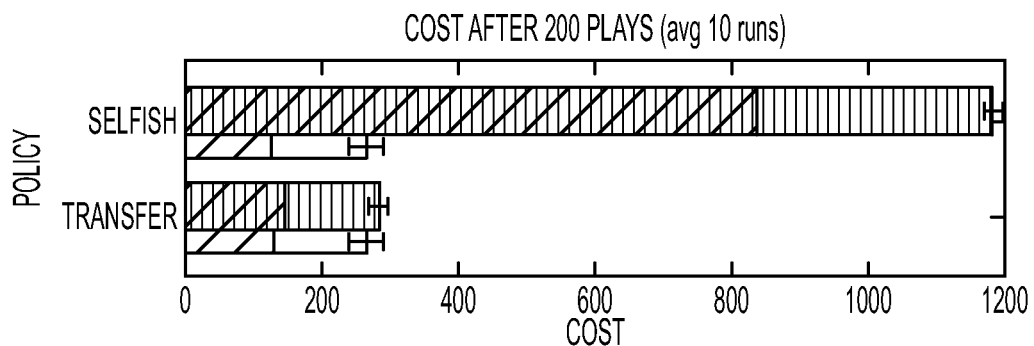
FIG. 10 is a graphical illustration of the split of costs between assignment costs and time-out costs of two polices for real demand and low transfers costs.
Figure 11:
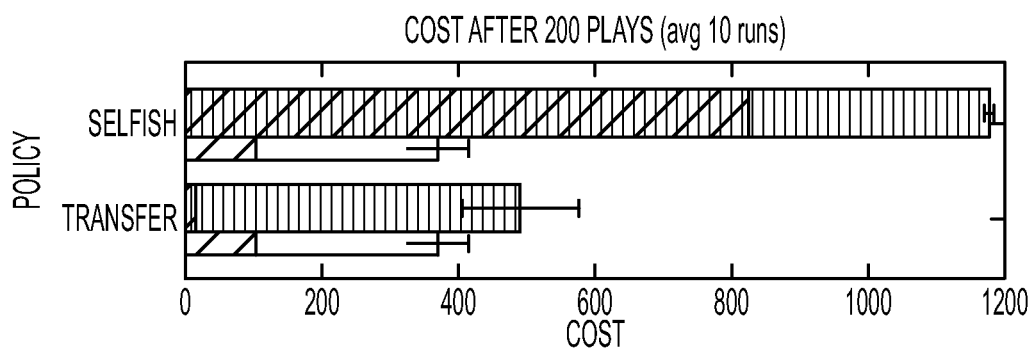
FIG. 11 is a graphical illustration of the split of costs between assignment costs and time-out costs of two polices for real demand and high transfers costs.
Figure 12:
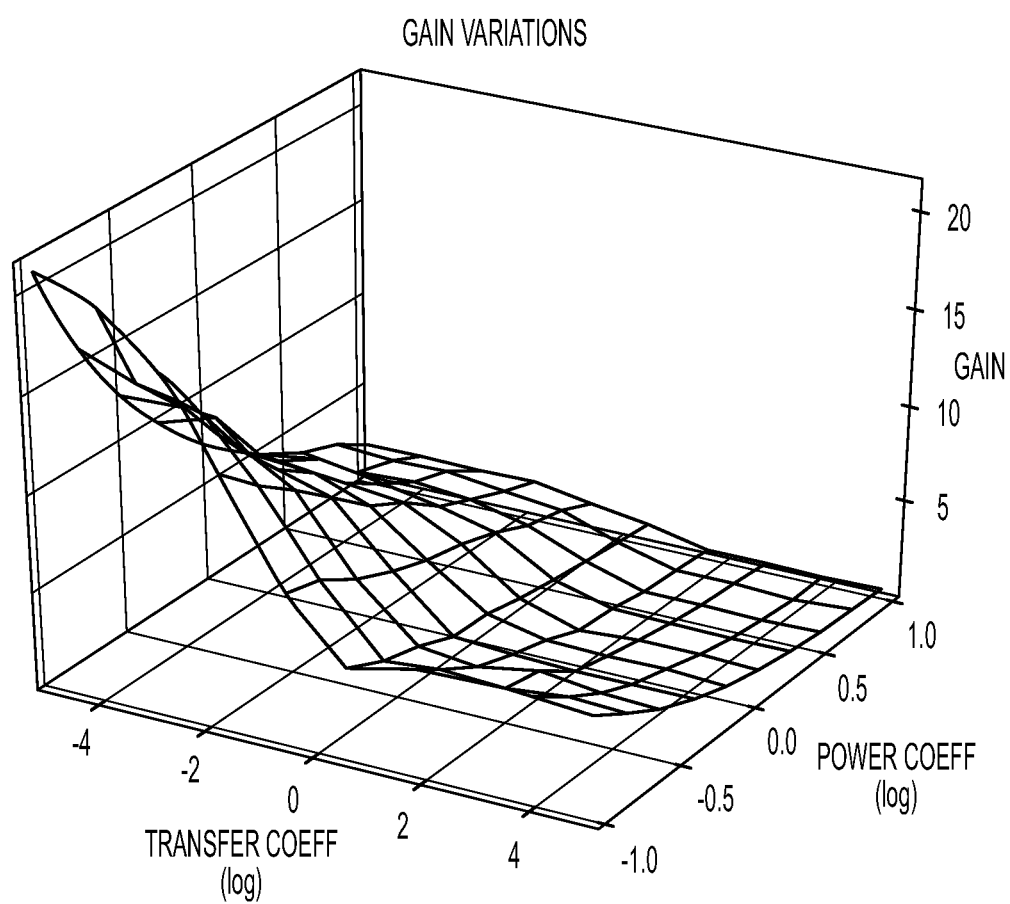
FIG. 12 is a graphical illustration of variation of the gain depending on a transfer cost factor and a consumption cost factor with log scale for both factors.

The results are show in FIGS. 10 and 11 for low transfer costs and high transfer costs, respectively. The data consists of about 3600 jobs over one month obtained from a real infrastructure, in which only the three most used devices are retained. The first job of each day is removed so that its arrival time, typically from the night before and typically an outlier, is not counted. A useful measure is given by the "gain", which is the ratio of the cost of the selfish policy to that of the transfer policy. The gain is plotted in FIG. 12 as a function of two coefficients. The transfer coefficient (in logarithmic scale) is applied multiplicatively to the transfer cost matrix R. When that coefficient gets smaller, the transfer costs decrease allowing higher gains by transfer. The power coefficient (in logarithmic scale too) is applied multiplicatively to the consumption cost rate vector a. When that coefficient gets smaller, consumption decreases, allowing longer time-outs for all the devices and increasing the gain.

Although the present disclosure has been described with respect to a multi-device print system 10, it is to be appreciated that it finds application in other usage scenarios. For example, it could be applied to an inventory management system, where the print devices 12 are replaced with items in the inventory which are interchangeable at a cost, electricity consumption corresponds to holding cost, and the penalty for not having an item is infinite (this corresponds to the constraint of immediate execution of the jobs. Furthermore, a single item can serve multiple demands, so there is never need for more than one unit of the item, and there is an option of throwing it away, possibly at a cost.

Even more, although the present disclosure has been described for power consumption, it is to be appreciated that it is more broadly applicable to energy consumption. As used herein, the term "energy" is the amount of power consumed. In contrast, power is the rate of energy consumption. In the context of a print system, energy costs include the amount of power used to complete a print job, the energy cost of making paper, ink/toner, and other resources which need replacement, and so on. For example, printing on lighter paper sheets saves energy since thick paper requires more energy to manufacture. Hence, the present disclosure can transfer print jobs and optimize time-outs so as to use the least amount of energy, including the energy going in to manufacturing components thereof, such as consumable components (e.g., ink, paper, etc.).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A control system for reducing energy consumption in an associated multi-device system comprising a plurality of devices, said energy control system comprising:
   at least one processor programmed to:
   receive a job to be executed;
   receive a selection of one of the plurality of devices for executing the job and a transfer cost for transferring the job from the selected device to each of the plurality of devices;
   determine a device from the plurality of devices to execute the job through optimization of a first cost function, the first cost function based on the device selection and the received transfer costs;
   assign the job to the determined device;
   determine a time-out for each device in the multi-device system through optimization of a second cost function, the second cost function based on an expected energy consumption by the multi-device system; and,
   provide the devices with the determined time-outs;
   wherein at least one of the device and the time-outs are determined by modeling a control problem as a Markov Decision Process (MDP), the MDP including the first cost function and the second cost function, wherein at least one of:
   a) the first cost function in an optimal regime is computed according to the expression:

$$V_h\langle \sigma, z \rangle = \min_k R_{hk} + (1-\sigma_k)\hat{b}_k V\langle \sigma + (1-\sigma_k)e_k, z\rangle \quad (19)$$

where k is one of the plurality of devices; h is the selected one of the plurality of devices; $R_{hk}$ is the transfer cost for device k; $\hat{b}_k$ is the cost of transitioning device k from a first mode to a second mode, the second mode consuming more power than the first mode; a is a control state vector of the multi-device system, each k-th component indicating a state for device k, where a value of 0 corresponds to the first mode and 1 corresponds to the second mode; z is a demand state of the multi-device system; $\langle \sigma, z \rangle$ is a state of the multi-device system; $e_k$ is a vector of 0s for each component except the k-th component, which is 1; and V is the second cost function; and
   b) the second cost function in an optimal regime is computed according to the expression:

$$V\langle \sigma, z \rangle = \min_{(\tau_k) k \in \sigma} \int_{xl} \left[ \sum_{k \in \sigma} g_k(x, \tau_k) + \gamma \int_{z'} V\left( \sum_{k \in \sigma} II[x < \tau_k]e_k, z' \right) dQ(z'|zxl) \right] dP(xl|z), \quad (5)$$

where k is one of the plurality of devices; $g_k$ is a cost of maintaining device k in a second mode during part or all of a time between jobs x given a time-out $\tau$; $\gamma$ is a discount factor; l is a selected device; $\sigma$ is a control state vector of the multi-device system, each k-th component indicating a state for device k, where a value of 0 corresponds to a first mode and 1 corresponds to the second mode, the second mode consuming more power than the first mode; z is a demand state of the multi-device system; $\langle \sigma, z \rangle$ is a state of the multi-device system; $e_k$ is a vector of 0s for each component exception the k-th component, which is 1; $V_l$ is the first cost function; II[condition] returns 1 if condition is met and 0 otherwise; P is a probability distribution of time of a next job and its device given a demand state; and Q is a probability distribution of a next demand state given a previous demand state and time since a previous job and the selected device.

2. The control system according to claim 1, wherein the transfer cost for a device is the cost to a user from executing the job on the device in terms of reduction in print quality.

3. The control system according to claim 1, wherein the time-out for a device is the time for which the device remains in a first mode, after a job is completed, before moving to a second mode, which consumes less energy, in the absence of the arrival of another job.

4. The control system according to claim 1, wherein the time-out for a device is based on an estimation of demand for the devices and transfer costs between the devices.

5. The control system according to claim 1, wherein the expected energy consumption is based on probability distributions for device selections and times between jobs received by the plurality of devices.

6. The control system according to claim 5, wherein the probability distributions are computed for different demand states of the multi-device system.

7. The control system according to claim 1, wherein the MDP is solved using a value-iteration method.

8. The control system according to claim 1, wherein the optimization of the second cost function is reduced to a bounded sequence of one dimensional optimizations.

9. The control system according to claim 1, wherein the first cost function and the second cost function are minimized at least partially in a selected function space.

10. A multi-device print system comprising the control system of claim 1 and a plurality of the devices, the devices being print devices.

11. The system according to claim 1, wherein the at least one processor is further programmed to:
receive the job, the selection, and the transfer cost, from a remote device over a communications network.

12. The system according to claim 1, wherein the expected energy consumption is the combined energy consumption expected of all of the plurality of devices.

13. The control system according to claim 1, wherein the at least one processor is further programmed to at least one of:
determine a globally optimal device from the plurality of devices to execute the job through optimization of the first cost function; and
determine a globally optimal time-out for each device in the multi-device system through optimization of the second cost function, the time-out for each device being the time for which the device remains in a first mode, after a job is completed, before moving to a second mode, which consumes less energy, in the absence of the arrival of another job.

14. A method for reducing energy consumption in a multi-device system comprising a plurality of devices, said method comprising:
receiving a job to be executed;
receiving a selection of one of the plurality of devices for executing the job and a transfer cost for transferring the job from the selected device to each of the plurality of devices;
determining a device from the plurality of the devices to execute the job through optimization of a first cost function, the first cost function based on the device selection, the received transfer costs, and power consumption costs of transitioning devices of the plurality of devices between different energy consumption modes;
assigning the job to the determined device;
determining a globally optimal time-out for each device in the multi-device system through optimization of a second cost function, the time-out for each device being the time for which the device remains in a first of the energy consumption modes, after a job is completed, before moving to a second of the energy consumption modes, which consumes less energy, in the absence of the arrival of another job, the second cost function being based on an expected energy consumption by the multi-device system; and,
providing the devices with the determined time-outs;
wherein the expected energy consumption is based on probability distributions for device selections and times between jobs; and
wherein at least one of the determining of the device and the determining of the time-outs includes:
modeling a control problem as a Markov Decision Process (MDP), the MDP including the first cost function and the second cost function and wherein at least one of:
a) the first cost function in an optimal regime is computed according to the expression:

$$V_h \langle \sigma, z \rangle = \min_k R_{hk} + (1-\sigma_k)\hat{b}_k V \langle \sigma + (1-\sigma_k)e_k, z \rangle \tag{19}$$

where k is one of the plurality of devices; h is the selected one of the plurality of devices; $R_{hk}$ is the transfer cost for device k; $\hat{b}_k$ is the cost of transitioning device k from a first mode to a second mode, the second mode consuming more power than the first mode; $\sigma$ is a control state vector of the multi-device system, each k-th component indicating a state for device k, where a value of 0 corresponds to the first mode and 1 corresponds to the second mode; z is a demand state of the multi-device system; $\langle \sigma, z \rangle$ is a state of the multi-device system; $e_k$ is a vector of 0s for each component except the k-th component, which is 1; and V is the second cost function; and b) the second cost function in an optimal regime is computed according to the expression:

$$V\langle \sigma, z \rangle = \min_{(\tau_k)k \in \sigma} \int_{xl} \left[ \begin{array}{c} \Sigma_{k \in \sigma} g_k(x, \tau_k) + \\ \gamma \int_{z'} V_l \langle \Sigma_{k \in \sigma} II[x < \tau_k]e_k, z' \rangle dQ(z' \mid zxl) \end{array} \right] dP(xl \mid z), \tag{5}$$

where $g_k$ is a cost of maintaining device k in a second mode during part or all of a time between jobs x given a time-out $\tau$; $\gamma$ is a discount factor; l is a selected device; $\sigma$ is a control state vector of the multi-device system, each k-th component indicating a state for device k, where a value of 0 corresponds to a first mode and 1 corresponds to the second mode, the second mode consuming more power than the first mode; $V_l$ is the first cost function; II[condition] returns 1 if condition is met and 0 otherwise; P is a probability distribution of time of a next job and its device given a demand state; and Q is a probability distribution of a next demand state given a previous demand state and time since a previous job and the selected device.

15. The method according to claim 14, wherein the time-out for a device is based on an estimation of demand for the device and transfers to the device.

16. The method according to claim 14, wherein the minimization of the second cost function includes:
reducing the optimization of the second cost function to a bounded sequence of one dimensional optimizations.

17. The method according to claim 14, wherein the minimization of the first cost function and the second cost function is performed at least partially in a function space.

18. A computer program product comprising a non-transitory recording medium wherein, when executed by a computer, performs the method of claim 14.

19. The method according to claim 14, wherein the expected energy consumption is the combined energy consumption expected of all of the plurality of devices.

20. A printing system comprising:
a plurality of print devices; and,
a control system for reducing energy consumption, said control system comprising:
at least one processor programmed to:
receive a print job to be executed;
receive a print job ticket submitted by a user, the print job ticket submitted including a selection of one of the plurality of print devices for executing the print job and a transfer cost for transferring the print job from the selected print device to each of the plurality of print devices;
determine a print device from the plurality of print devices to execute the print job through optimization of a first cost function, the first cost function based on the print device selection, the received transfer costs, and power consumption costs of transitioning devices of the plurality of devices between different energy consumption modes;
assign the print job to the determined print device;
determine a globally optimized time-out for each of the plurality of print devices through optimization of a second cost function, wherein the time-out for each print device is the time for which the device remains in a first mode, after a job is completed, before moving to a second mode, which consumes less energy, in the absence of the arrival of another print job, the second cost function being based on an expected energy consumption by the printing system, the expected energy consumption being the combined energy consumption expected of all of the plurality of devices; and,
provide the print devices with the determined time-outs; and
wherein at least one of the determining of the print device and the determining of the time-outs includes:
modeling a control problem as a Markov Decision Process (MDP), the MDP including the first cost function and the second cost function and wherein at least one of:
a) the first cost function in an optimal regime is computed according to the expression:

$$V_h\langle \sigma, z \rangle = \min_k R_{hk} + (1-\sigma_k) \hat{b}_k V \langle \sigma + (1-\sigma_k) e_k, z \rangle \qquad (19)$$

where k is one of the plurality of devices; h is the selected one of the plurality of devices; $R_{hk}$ is the transfer cost for device k; $\hat{b}_k$ is the cost of transitioning device k from a first mode to a second mode, the second mode consuming more power than the first mode; σ is a control state vector of the multi-device system, each k-th component indicating a state for device k, where a value of 0 corresponds to the first mode and 1 corresponds to the second mode; z is a demand state of the multi-device system; $\langle \sigma, z \rangle$ is a state of the multi-device system; $e_k$ is a vector of 0s for each component except the k-th component, which is 1; and V is the second cost function; and b) the second cost function in an optimal regime is computed according to the expression:

$$V\langle \sigma, z \rangle = \qquad (5)$$
$$\min_{(\tau_k)k \in \sigma} \int_{xl} \left[ \begin{array}{c} \Sigma_{k \in \sigma} g_k(x, \tau_k) + \\ \gamma \int_{z'} V_l \langle \Sigma_{k \in \sigma} II[x < \tau_k] e_k, z' \rangle dQ(z' | zxl) \end{array} \right] dP(xl | z),$$

where $g_k$ is a cost of maintaining device k in a second mode during part or all of a time between jobs x given a time-out t; γ is a discount factor; l is a selected device; a is a control state vector of the multi-device system, each k-th component indicating a state for device k, where a value of 0 corresponds to a first mode and 1 corresponds to the second mode, the second mode consuming more power than the first mode; $V_l$ is the first cost function; II[condition] returns 1 if condition is met and 0 otherwise; P is a probability distribution of time of a next job and its device given a demand state; and Q is a probability distribution of a next demand state given a previous demand state and time since a previous job and the selected device.

* * * * *